(12) United States Patent
Miyata

(10) Patent No.: US 10,754,017 B2
(45) Date of Patent: Aug. 25, 2020

(54) TARGET OBJECT INFORMATION ACQUISITION APPARATUS

(71) Applicant: TOYOTA JIDOSHA KABUSHIKI KAISHA, Toyota-shi, Aichi-ken (JP)

(72) Inventor: Shunsuke Miyata, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 281 days.

(21) Appl. No.: 16/002,024

(22) Filed: Jun. 7, 2018

(65) Prior Publication Data
US 2018/0356505 A1 Dec. 13, 2018

(30) Foreign Application Priority Data

Jun. 9, 2017 (JP) .................................. 2017-114778

(51) Int. Cl.
| G01S 13/06 | (2006.01) |
| G01S 13/87 | (2006.01) |
| G01S 13/72 | (2006.01) |
| G01S 13/86 | (2006.01) |
| G01S 13/931 | (2020.01) |
| B60K 31/00 | (2006.01) |
| B60W 40/114 | (2012.01) |
| G01S 13/00 | (2006.01) |

(52) U.S. Cl.
CPC .......... *G01S 13/06* (2013.01); *B60K 31/0008* (2013.01); *B60W 40/114* (2013.01); *G01S 13/726* (2013.01); *G01S 13/867* (2013.01); *G01S 13/878* (2013.01); *G01S 13/931* (2013.01); *B60W 2554/4041* (2020.02); *B60W 2720/106* (2013.01); *G01S 13/86* (2013.01); *G01S 2013/932* (2020.01); *G01S 2013/93271* (2020.01); *G01S 2013/93272* (2020.01); *G01S 2013/93274* (2020.01)

(58) Field of Classification Search
CPC ..................................................... G01S 13/003
See application file for complete search history.

(56) References Cited

U.S. PATENT DOCUMENTS 5,850,625 A * 12/1998 Maren ..................... G01S 13/86
702/93
5,949,365 A * 9/1999 Wagner .................. G01S 13/931
342/70

(Continued)

FOREIGN PATENT DOCUMENTS

| JP | 2014-148293 A | 8/2004 |
| JP | 2005-138647 A | 6/2005 |

(Continued)

*Primary Examiner* — Bernarr E Gregory
(74) *Attorney, Agent, or Firm* — Sughrue Mion, PLLC

(57) ABSTRACT

A target object information acquisition apparatus includes a driving support ECU configured to select, when two or more sensor target objects detected by one of radar sensors among the grouped sensor target objects are present, the sensor target object having a shortest distance with respect to an own vehicle among the two or more sensor target objects detected as a width calculation sensor target object. The driving support ECU is configured to calculate a width of the fusion target object using the lateral position with respect to the own vehicle of the selected width calculation sensor target object.

4 Claims, 15 Drawing Sheets

(56) References Cited

U.S. PATENT DOCUMENTS

| | | | | |
|---|---|---|---|---|
| 6,492,935 B1* | 12/2002 | Higuchi | ............... | G01S 13/931 342/70 |
| 8,049,658 B1* | 11/2011 | Lagonik | ............... | G01S 13/867 342/118 |
| 9,199,643 B1* | 12/2015 | Zeng | ............... | G01S 13/931 |
| 9,507,016 B2* | 11/2016 | Sudou | ............... | G01S 13/931 |
| 10,527,719 B2* | 1/2020 | Tamura | ............... | G01S 13/931 |
| 2002/0120391 A1* | 8/2002 | Nehls, III | ............... | G01S 7/22 701/120 |
| 2005/0267683 A1* | 12/2005 | Fujiwara | ............... | G01S 13/931 701/301 |
| 2005/0270145 A1 | 12/2005 | Kataoka et al. | | |
| 2006/0025918 A1 | 2/2006 | Saeki | | |
| 2010/0253597 A1* | 10/2010 | Seder | ............... | G01S 13/931 345/7 |
| 2011/0025548 A1* | 2/2011 | Nickolaou | ............... | G01S 13/931 342/52 |
| 2011/0118980 A1* | 5/2011 | Hoy | ............... | G01S 13/867 701/301 |
| 2011/0190972 A1* | 8/2011 | Timmons | ............... | G08G 1/166 701/31.4 |
| 2012/0019655 A1* | 1/2012 | Fukamachi | ............... | G06T 7/215 348/142 |
| 2015/0198711 A1* | 7/2015 | Zeng | ............... | G01S 13/931 342/59 |
| 2016/0311464 A1 | 10/2016 | Yamaoka | | |
| 2018/0151073 A1* | 5/2018 | Minemura | ............... | G01S 13/931 |
| 2018/0367871 A1* | 12/2018 | Zeng | ............... | G01S 13/931 |

FOREIGN PATENT DOCUMENTS

| | | |
|---|---|---|
| JP | 2006-315491 A | 11/2006 |
| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2009-274594 A | 11/2009 |
| JP | 2010-006279 A | 1/2010 |
| JP | 4929777 B2 | 5/2012 |
| JP | 2016-207060 A | 12/2016 |
| JP | 2017-074823 A | 4/2017 |
| WO | WO98/00728 A1 * | 1/1998 ........... G01S 13/003 |
| WO | WO2017/122529 A1 * | 7/2017 ........... G01S 13/867 |

* cited by examiner

TARGET OBJECT INFORMATION ACQUISITION APPARATUS

BACKGROUND OF THE INVENTION

1. Field of the Invention

The present invention relates to a target object information acquisition apparatus for acquiring target object information on a three-dimensional object (for example, a vehicle other than an own vehicle) present around a vehicle (the own vehicle), such as a width of the object, a length of the object, and the like.

2. Description of the Related Art

A lane changing support/assist apparatus, which has been conventionally known, supports/assists a steering operation (a steering wheel operation) for changing lanes (for example, refer to Japanese Patent Application Laid-Open No. 2009-274594). The lane changing support apparatus detects a three-dimensional object (for example, a vehicle other than an own vehicle) present around the own vehicle using a plurality of radar sensors (for example, millimeter wave radars or laser radars) provided to the own vehicle, and acquires information (hereinafter, also referred to as "target object information") including "a longitudinal position, a lateral position, and a relative speed" of the three-dimensional object with respect to the own vehicle, and "a width and a length" of the three-dimensional object.

The lane changing support apparatus monitors whether or not the own vehicle is able to safely change lanes based on the acquired target object information, and performs a lane changing support when the apparatus determines that the own vehicle can safely change lanes. Such an "apparatus which acquires the target object information on/of the three-dimensional object present around the own vehicle" is employed/adopted by not only the lane changing support apparatus but also by driving support apparatuses other than the lane changing support apparatus.

As is well known, the radar sensor transmits a radar wave around the radar sensor, receives a reflected wave generated by reflection of the transmitted radar wave at the three-dimensional object, recognizes a target object and acquires the target object information based on the reflected wave which the radar sensor has received. Therefore, for example, depending on a type of the three-dimensional object and a relative positional relationship between the three-dimensional object and the own vehicle, a case may arise where one radar sensor recognizes/acquires a plurality of target objects (reflection points) from a single three-dimensional object. Hereinafter, the target object (reflection point) recognized/acquired by the radar sensor is referred to as a "sensor target object". In particular, for example, when the three-dimensional object is a large object, such as a truck, a bus, and the like, a plurality of sensor target objects tend to be recognized/acquired from a single three-dimensional object.

The inventor of the present invention has found that, when the lane changing support apparatus recognizes/acquires a plurality of sensor target objects from a single three-dimensional object, a case may arise where a large calculation error sometimes occurs depending on what target object information of the sensor target object among a plurality of the recognized sensor target objects is used for, in particular, calculating a width of the three-dimensional object.

SUMMARY OF THE INVENTION

The present invention has been made in order to solve the above-described problem. That is, one of objects of the present invention is to provide a target object information acquisition apparatus capable of acquiring/obtaining "target object information including a width of a three-dimensional object" more accurately by using radar sensors. Hereinafter, the target object information acquisition apparatus according to the present invention is also sometimes referred to as the "present invention apparatus".

The present invention apparatus comprises a plurality of radar sensors (16FC, 16FL, 16FR, 16RL, and 16RR), a fusion target object generating means (10), and a fusion target object information calculating means (10).

Each of the radar sensors transmits radar wave to surroundings of an own vehicle to detect a reflection point of a three-dimensional object of the radar wave, as a sensor target object (Bn), and acquires/obtains, as sensor target object information, a longitudinal position (Xobj), a lateral position (Yobj), and a relative speed (Vxobj, Vyobj) of the detected sensor target object with respect to the own vehicle.

The fusion target object generating means for grouping, when a plurality of the sensor target objects are detected, the sensor target objects that are selected from the plurality of the detected sensor target objects and that are likely to be obtained from a single three-dimensional object, to generate a fusion target object (FBn) representing the three-dimensional object (step 1115, step 1225, and step 1415).

The fusion target object information calculating means for calculating a width (Wf) of the fusion target object as one of attribute values of the fusion target object, based on the sensor target object information of the grouped sensor target objects that are used for generating the fusion target object (step 1120, step 1315, and step 1420).

As illustrated in FIG. 5A, a peripheral radar sensor detects each of reflection points of a single three-dimensional object with an error range of an angle θm. Further, the peripheral radar sensor has a tendency to preferentially detect corner portions of the three-dimensional object (as the reflection points). Therefore, the lateral position of the sensor target object used for obtaining/calculating the width of the three-dimensional object fluctuates/varies within a range of a value ΔEW2 when the reflection point (sensor target object) is in the vicinity of the own vehicle. In contrast, the lateral position of the sensor target object used for obtaining/calculating the width of the three-dimensional object fluctuates/varies within a range of "a value ΔEW1 larger than the value ΔEW2" when the reflection point is far from (is not in the vicinity of) the own vehicle. As a result, as illustrated in FIG. 6A, for example, when it is assumed that the fusion target object information calculating means calculates the width Wf of the fusion target object using the lateral position of the sensor target object BFCa3 (the sensor target object corresponding to the point P1 in FIG. 5A) as a "position indicative of one of the end points in a width direction of the fusion target object", the calculated width Wf (=Wcal) would be greatly different from the true value Wtrue.

In view of the above, the fusion target object information calculating means is configured:

to select, when two or more of the sensor target objects detected by one of the radar sensors are present among the grouped sensor target objects (for example, refer to sensor objects BFCa1, BFca2 and BFca3 in FIGS. 6A and 6B), a specific one of the sensor target objects (for example, the sensor target object Bfca1) having a shortest distance from the own vehicle from among the two or more of the sensor target objects detected by the one of the radar sensors, as a width calculation sensor target object; and to calculate the width (=Wcal) of the fusion target object using the lateral position (for example, Ycal) with respect to the own vehicle of the width calculation sensor target object (step 1525, step 1530 and step 1545).

According to the thus configured present invention apparatus, the error in (included in) the "lateral position of the fusion target object" with respect to the true value is small, which is used for calculating the width (Wf) of the fusion target object. As a result, it is possible to accurately calculate the width (Wf) of the fusion target object.

In one of aspects of the present invention apparatus, the fusion target object information calculating means is configured:

to select, when the number of the sensor target objects detected by the one of the radar sensors among the grouped sensor target objects that are used for generating the fusion target object is only one (for example, refer to sensor object BFLa1 in FIG. 6B), the only one sensor target object as the width calculation sensor target object (step 1515);

to select, as a minimum lateral position (Yminh), when the number of the sensor target objects selected as the width calculation sensor target objects is two or more, a lateral position which is the smallest among the lateral positions of the selected width calculation sensor target objects, and to select, as a maximum lateral position (Ymaxh), a lateral position which is the largest among the lateral positions of the selected width calculation sensor target objects (step 1530); and to calculate a magnitude (|Ymaxh−Yminh|) of a difference between the maximum lateral position and the minimum lateral position, as the width of the fusion target object (step 1545).

According to the above-mentioned aspect, each of the maximum lateral position and the minimum lateral position is determined based on the lateral position of the sensor target object having a small error in the lateral position, and the magnitude of a difference between the maximum lateral position and the minimum lateral position is calculated as the width (Wf) of the fusion target object. Therefore, the above-mentioned aspect can accurately calculate the width (Wf) of the fusion target object.

In one of aspects of the present invention apparatus, the fusion target object information calculating means is configured:

to calculate the length of the fusion target object, which is one of the attribute values of the fusion target object, using the longitudinal positions of the grouped sensor target objects (step 1545).

As illustrated in FIG. 5B, the peripheral radar sensor detects each of the reflection points of the three-dimensional object with (within) the error range of the angle θm, however, the longitudinal position of the sensor target object detected/acquired when the reflection point is in vicinity of the own vehicle is not greatly different from the longitudinal position of the sensor target object detected/acquired when the reflection point is far from (is not in the vicinity of) the own vehicle. That is, the difference between the value ΔEL1 and ΔEL2, shown in FIG. 5B, is small.

In view of the above, the fusion target object information calculating means is configured:

to select, as a minimum longitudinal position (Xminh), when the number of the grouped sensor target objects is two or more, a longitudinal position which is the smallest among the longitudinal positions of the grouped sensor target objects, and to select, as a maximum longitudinal position, a longitudinal position which is the largest among the longitudinal positions (Xmaxh) of the grouped sensor target objects (step 1535 and step 1540); and to calculate a magnitude of a difference (|Xmaxh−Xminh|) between the maximum longitudinal position and the minimum longitudinal position, as the length (Lf) of the fusion target object (step 1545).

According to the above-mentioned aspect, the length (Lf) of the fusion target object can be calculated accurately, even when there are a plurality of the sensor target objects that are grouped, and all of the grouped sensor targets are detected by only one of the radar sensors.

In one of aspects of the present invention apparatus, the fusion target object information calculating means is configured:

to select, as a first sensor target object, one of the grouped sensor target objects which has a detection period equal to or longer than a threshold time from among the grouped sensor target objects, the detection period being a period for which each of the grouped sensor target objects has been continuously detected (step 1505), and to use only the sensor target object information of the selected first sensor target object as the sensor target object information for calculating the attribute values of the fusion target object (step 1510).

When the sensor target object is a so-called ghost target object, and/or when the sensor target object is erroneously detected due to noise, it is unlikely that the sensor target object continues being detected as a target representing the same target for a long time. Therefore, the first sensor target object whose detection period is equal to or longer than the threshold period is unlikely to be erroneously detected. The above-mentioned aspect uses only the sensor target object determined to be the first sensor target object which is unlikely to be erroneously detected, as the sensor target object used for calculating the attribute values of the fusion target object. Therefore, the above-mentioned aspect can accurately calculate the attribute values of the fusion target object.

In the above description, references used in the following descriptions regarding embodiments are added with parentheses to the elements of the present invention, in order to assist in understanding the present invention. However, those references should not be used to limit the scope of the invention. Other objects, other features, and accompanying advantages of the present invention will be readily understood from the description of embodiments of the present invention to be given referring to the following drawings.

DETAILED DESCRIPTION OF THE PREFERRED EMBODIMENT

A target information acquisition apparatus according to an embodiment of the present invention will be described below, referring to drawings. The target information acquisition apparatus is incorporated in a lane changing support apparatus (hereinafter also referred to as a "present apparatus") which is a part of a drive supporting control apparatus (a vehicle traveling control apparatus).

<Construction>

Figure 1:
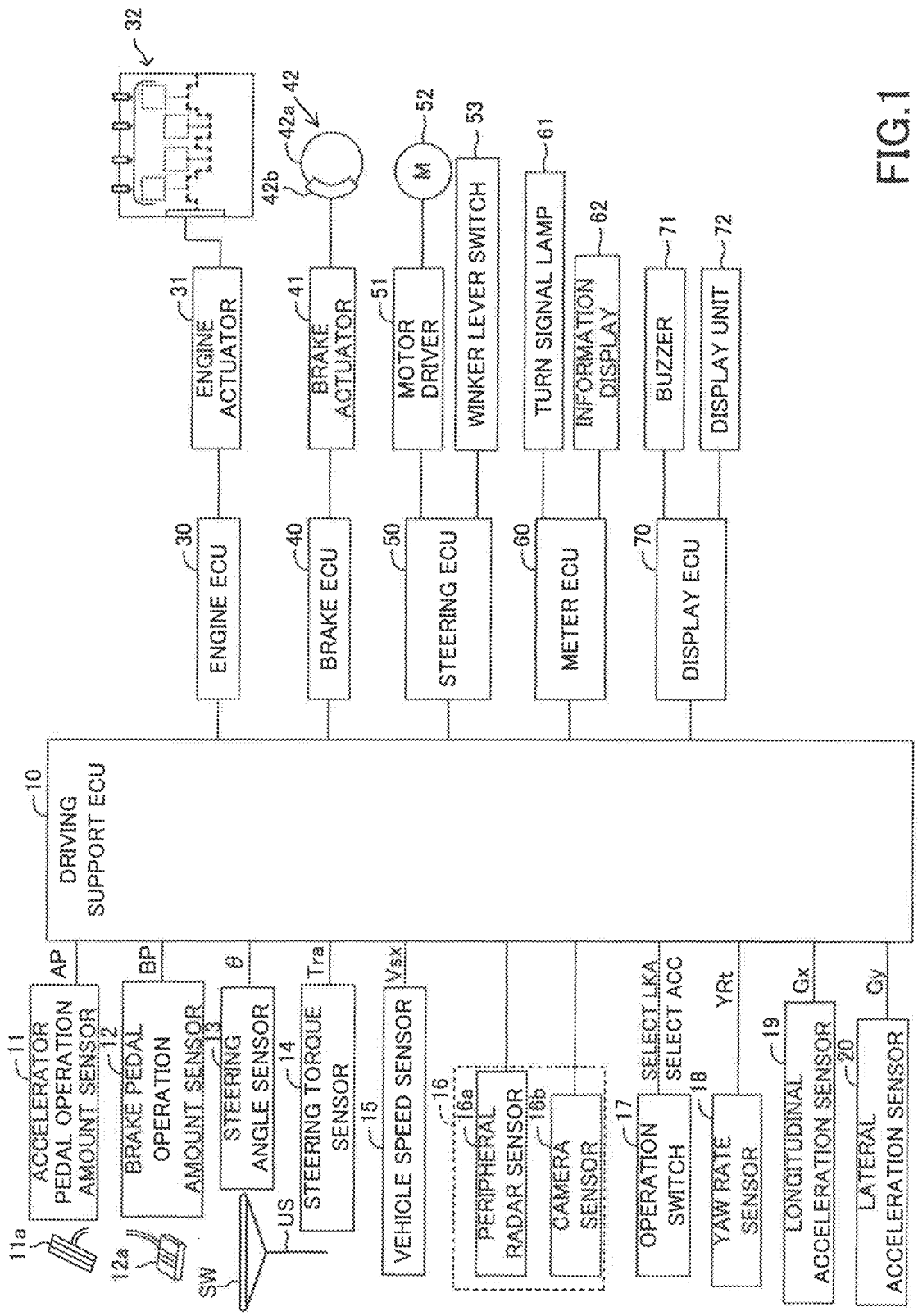
FIG. 1 is a schematic configuration diagram for illustrating a driving support apparatus including target object information acquisition apparatus according to an embodiment of the present invention.

As shown in FIG. 1, the present apparatus is applied to a vehicle (hereinafter referred to as an "own vehicle" to distinguish the vehicle from other vehicles). The present apparatus includes a driving support ECU 10, an engine ECU 30, a brake ECU 40, a steering ECU 50, a meter ECU 60, and a display ECU 70. It should be noted that the driving support ECU 10 is simply referred to (expressed) as a "DSECU", in the following description.

Each of those ECUs is an electronic control unit comprising a microcomputer as a main part. The ECUs are connected with each other via a CAN (Controller Area Network) which is not illustrated so that they are capable of mutually transmitting and receiving information. In the present specification, the microcomputer includes a CPU, a ROM, a RAM, a non-volatile memory, an interface I/F, and the like. The CPU is configured to realize various functions by executing instructions (programs, routines) stored in the ROM. Some or all of these ECUs may be integrated into a single ECU.

The DSECU is connected to sensors (including switches) described below, and is configured to receive a detection signal or an output signal of each of the sensors. It should be noted that each of the sensors may be connected to one of the ECUs other than the DSECU. In this case, the DSECU receives the detection signal or the output signal of the sensor via CAN from the ECU connected to that sensor.

The sensors are as follows:

An accelerator pedal operation amount sensor 11 for detecting an operation amount of an accelerator pedal 11a.

A brake pedal operation amount sensor 12 for detecting an operation amount of a brake pedal 12a.

A steering angle sensor 13 for detecting a steering angle θ of a steering wheel SW.

A steering torque sensor 14 for detecting a steering torque Tra applied to a steering shaft US of the own vehicle through an operation of the steering wheel SW.

A vehicle speed sensor 15 for detecting a traveling speed (vehicle speed) of the own vehicle to output a speed Vsx which is a speed in a longitudinal direction of the own vehicle (that is, a longitudinal speed).

Peripheral sensors 16 including peripheral radar sensors 16a and a camera sensor 16b.

An operation switch 17.

A yaw rate sensor 18 for detecting a yaw rate YRt of the own vehicle SV.

A longitudinal acceleration sensor 19 for detecting a longitudinal acceleration Gx of the own vehicle SV.

A lateral acceleration sensor 20 for detecting an acceleration Gy in a lateral direction (vehicle width direction) of the own vehicle SV (Gy in an orthogonal direction to a center axis line of the own vehicle SV).

Figure 2:
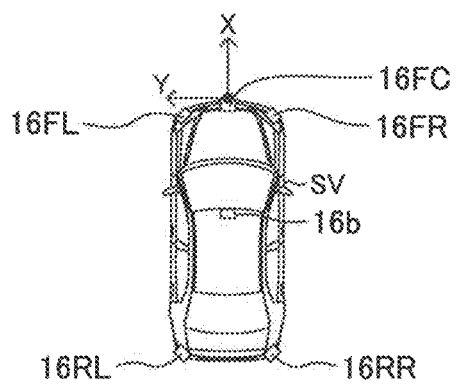
FIG. 2 is a plan view of an own vehicle for illustrating an arrangement position of peripheral radar sensors shown in FIG. 1.

As shown in FIG. 2, the peripheral radar sensors 16a include a central front peripheral sensor 16FC, a right front peripheral sensor 16FR, a left front peripheral sensor 16FL, a right rear peripheral sensor 16RR, and a left rear peripheral sensor 16RL. The peripheral radar sensors 16a may be simply referred to as "radar sensors" in some cases.

When there is no need to individually distinguish the peripheral sensors 16FC, 16FR, 16FL, 16RR, and 16RL from each other, each of them is referred to as the peripheral radar sensor 16a, and they are referred to as the peripheral radar sensors 16a. The peripheral sensors 16FC, 16FR, 16FL, 16RR, and 16RL have substantially the same configuration as each other.

The peripheral radar sensor 16a includes a radar transmitting/receiving section (not shown) and a signal processing section (not shown). The radar transmitting/receiving section radiates a radar wave (hereinafter also referred to as a "millimeter wave") which is an electric wave in a millimeter waveband, and receives the millimeter wave (that is, a reflected wave) reflected from a three-dimensional object (for example, a vehicle other than the own vehicle, a pedestrian, a bicycle, a building, and the like) present in a radiation area of the millimeter wave. The point of the three-dimensional object which reflects the radar wave (millimeter wave) is also referred to as a "reflection point".

The signal processing section acquires (detects), every time a predetermined time elapses, reflection point information indicative of a distance between the own vehicle SV and the reflection point of the three-dimensional object, a relative speed between the own vehicle SV and the reflection point of the three-dimensional object, and a direction of the reflection point of the three-dimensional object relative to the own vehicle SV, based on, for example, a phase difference between the transmitted millimeter wave and the received reflected wave, a frequency difference between them, an attenuation level of the reflected wave, and a time (period) from when the millimeter wave is transmitted to a time point when the reflected wave is received. The reflection point of the three-dimensional object is regarded as a target object and is also referred to as the "sensor target object".

The center front peripheral sensor 16FC is provided/disposed at a front central portion of a vehicle body and detects the sensor target object present in a front area of the own vehicle SV. The right front peripheral sensor 16FR is provided at a right front portion of the vehicle body and mainly detects the sensor target object present in a right front area of the own vehicle SV. The left front peripheral sensor 16FL is provided at a left front portion of the vehicle body and mainly detects the sensor target object present in a left front area of the own vehicle SV. The right rear peripheral sensor 16RR is provided at a right rear portion of the vehicle body and mainly detects the sensor target object present in a right rear area of the own vehicle SV. The left rear peripheral sensor 16RR is provided at a left rear portion of the vehicle body and mainly detects the sensor target object present in a left rear area of the own vehicle SV. For example, the peripheral radar sensor 16a detects the sensor target object located within a range of about 100 meters from the own vehicle SV. It should be noted that the peripheral radar sensor 16a may be the radar sensor using the electric wave (radar wave) in a frequency band other than the millimeter wave band.

As shown in FIG. 2, the DSECU defines X-Y coordinates. An X axis is a coordinate axis which extends along the longitudinal direction of the own vehicle SV so as to pass through a central position in a width direction of a front-end portion of the own vehicle SV. The X axis defines a positive coordinate value for a position in a front direction of the own the vehicle. A Y axis is a coordinate axis which is orthogonal to the X axis. The Y axis defines a positive coordinate value for a position in a left direction of the own the vehicle. Each of an origin of the X axis and an origin of the Y axis is at the center position of the front-end portion of the own vehicle SV in the width direction.

The peripheral radar sensor 16a transmits, every time a predetermined time (calculation period) elapses, "information on the sensor target object" described below to the DSECU based on the reflection point information described above. Hereinafter, the "information on the sensor target object" is referred to as "sensor target object information".

The sensor target object information includes information described below.

An X coordinate position (Xobj) of the sensor target object. That is, a distance (having a sign of plus or minus) in an X axis direction between the own vehicle SV and the sensor target object. The X coordinate position Xobj is also referred to as a "longitudinal distance Xobj" or a "longitudinal position Xobj".

A Y coordinate position (Yobj) of the sensor target object. That is, a distance (having a sign of plus or minus) in a Y axis direction between the own vehicle SV and the sensor target object. The Y coordinate position Yobj is also referred to as a "lateral position Yobj".

A speed Vxobj of the sensor target object in the X axis direction with respect to the own vehicle SV (that is, the speed Vxobj is a longitudinal relative speed Vxobj). It should be noted that a longitudinal absolute speed Vaxobj is a value obtained by adding the vehicle speed V of the own vehicle SV to the longitudinal relative speed Vxobj.

A speed Vyobj of the sensor target object in the Y axis direction with respect to the own vehicle SV (that is, the speed Vyobj is a lateral relative speed Vyobj). It should be noted that a lateral absolute speed Vayobj is set to a value equal to the lateral relative speed Vyobj.

A "sensor target object identification information (sensor target object ID)" for identifying (specifying) the sensor target object.

A case may arise where one (a single) three-dimensional object has two or more of the reflection points. In that case, each of the peripheral radar sensors 16a may detect a plurality of sensor target objects for/from one three-dimensional object. That is, each of the peripheral radar sensors 16a may acquire a plurality of sets of the sensor target object information. Further, a case may arise where the two or more of the peripheral radar sensors 16a acquire the sets of the sensor target object information for a single three-dimensional object.

Thus, the DSECU performs grouping (integrating, fusing) a plurality of the sensor target objects that are highly likely to be obtained from a single three-dimensional object, to thereby recognize the single target object identified/represented by a plurality of the sensor target objects. Hereinafter, the target object identified/represented by a plurality of the sensor target objects is referred to as a "fusion target object".

Further, the DSECU acquires an "attribute value of the fusion target object (information on the attribute value)", as described later. The information on the attribute value of the fusion target object is referred to as "fusion target object information" or "fusion target object attribute values", and includes information described below.

The fusion target object information includes the values described below.

An X coordinate position (Xf) of the fusion target object. That is, a distance (having a sign of plus or minus) in the X axis direction between the own vehicle SV and the fusion target object.

In this example, the X coordinate position Xf is an X coordinate position of the center point of the fusion target object.

A Y coordinate position (Yf) of the fusion target object. That is, a distance (having a sign of plus or minus) in the Y axis direction between the own vehicle SV and the fusion target object.

In this example, the Y coordinate position Yf is a Y coordinate position of the center point of the fusion target object.

A speed Vxf of the fusion target object in the X axis direction with respect to the own vehicle SV. That is, the speed Vxf is a longitudinal relative speed Vxtf.

A speed Vyf of the fusion target object in the Y axis direction with respect to the own vehicle SV. That is, the speed Vyf is a lateral relative speed Vyf.

A length Lf of the fusion target object (length of the fusion target in the X axis direction).

A width Wf of the fusion target object (length of the fusion target in the Y axis direction).

A "fusion target object identification information (fusion target object ID)" for identifying (specifying) the fusion target object.

The camera sensor 16b includes a camera section which is a stereo camera and a lane recognition section which analyzes an image data taken (through photographing) by the camera section to recognize white lines on a road. The camera sensor 16b (camera section) photographs (takes an image of) a view in the front (ahead) of the own vehicle SV. The camera sensor 16b (lane recognition section) analyzes the image data in an image processing area having a predetermined angular range (range expanding in forward direction of the own vehicle SV) and recognizes (detects) the white lines (lane markers) formed on the road in front (ahead) of the own vehicle SV. The camera sensor 16b transmits information on the white lines which has been recognized to the DSECU.

Figure 3:
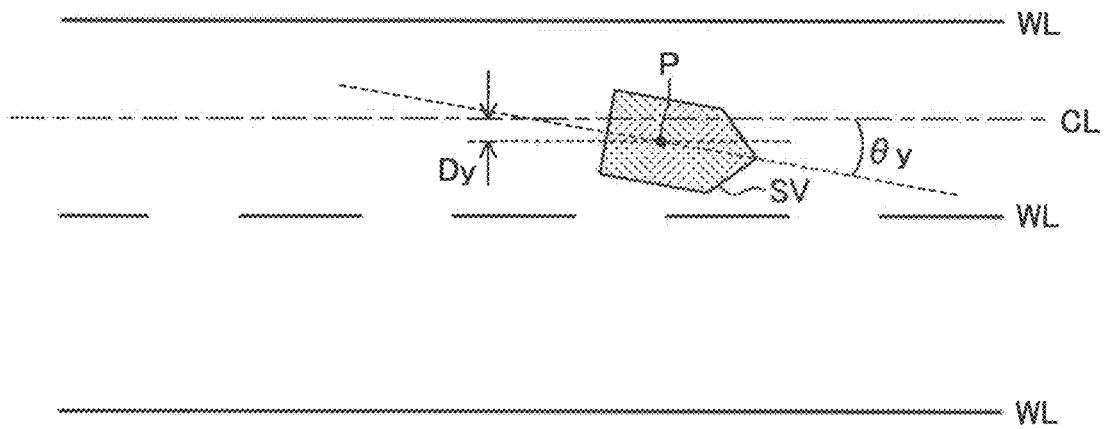
FIG. 3 is a plan view for illustrating the own vehicle and a road for explaining a lane keeping control.

As shown in FIG. 3, the DSECU specifies, based on the information supplied from the camera sensor 16b, a lane center line CL which is positioned at a center position in a width direction of the left and right white lines WL in a lane in which the own vehicle SV is traveling. Hereinafter, the lane in which the own vehicle SV is traveling is also referred to as an "own lane". The lane center line CL is used as a "target traveling line" in a lane keeping control (lane keeping support control) described later. Further, the DSECU calculates a curvature Cu of a curve of the lane center line CL. It should be noted that the curvature Cu is defined to be a positive value when the lane center line CL curves to the right, and to be a negative value when the lane center line CL curves to the left.

In addition, the DSECU calculates a position of the own vehicle SV in the lane (own lane) defined by the left white line and the right white line and a direction of the own vehicle SV in the lane. For example, as shown in FIG. 3, the DSECU calculates a distance Dy having a sign of plus or minus in a road width direction between a reference point P (for example, a center of gravity position) of the own vehicle SV and the lane center line CL. A magnitude of the "distance Dy having a sign of plus or minus" indicates a distance (length) by which the own vehicle SV is deviated/shifted in the road width direction with respect to (from) the lane center line CL. The distance Dy is defined to be a positive value (whose sign is plus) when the reference point P of the own vehicle SV deviates to the right side in the road width direction with respect to the lane center line CL, and to be a negative value (whose sign is minus) when the reference point P of the own vehicle SV deviates to the left side in the road width direction with respect to the lane center line CL. Hereinafter, the distance Dy having a sign of plus or minus is also referred to as a "lateral deviation Dy".

The DSECU calculates an angle θy formed between a direction of the lane center line CL and a direction (direction of a longitudinal axis of the own vehicle SV) in which the own vehicle C heads. Hereinafter, the angle θy is also referred to as a "yaw angle θy". The yaw angle θy is defined to be a positive value when the direction of the own vehicle SV inclines in the clockwise direction with respect to the direction of the lane center line CL, and to be a negative value when the direction of the own vehicle SV inclines in the counterclockwise direction with respect to the direction of the lane center line CL. Hereinafter, the information (Cu, Dy, θy) indicative of the curvature Cu, the lateral deviation Dy, and the yaw angle θy may sometimes be referred to as "lane-related vehicle information".

The camera sensor 16b supplies information about/on types of the left and right white lines on the own lane (for example, whether it is a solid line or a broken line), a shape of each of those lines, and the like to the DSECU. Further, the camera sensor 16b also supplies information about/on types of the left and right white lines on a lane adjacent to the own lane, and a shape of each of those lines, and the like to the DSECU. That is, the camera sensor 16b transmits the "information on the white lines" to the DSECU. When the white line is the solid line, the vehicle is prohibited from changing lanes through crossing the white line (the solid line). In contrast, when the white line is the broken line (white line segments intermittently formed at constant intervals), the vehicle is permitted to change lanes through crossing the white line (the broken line). The lane-related vehicle information (Cu, Dy, θy) and the information on the white lines may sometimes be referred to as "lane information".

The operation switch 17 is an operation device operated by the driver. The driver operates the operation switch 17 in order to select whether or not to perform each of "a lane changing support control, a lane keeping control, and a following-travel inter-vehicle-distance control", that will be described later. Thus, according to the operation of the driver, the operation switch 17 outputs/generates a signal indicative of whether or not each of the above-described controls has been selected to be performed. In addition, the operation switch 17 also has a function of allowing the driver to input or select parameters reflecting the driver's preference when the DSECU performs each of the above-described controls.

The engine ECU 30 is connected to an engine actuator 31. The engine actuator 31 includes a throttle valve actuator for changing an opening degree of a throttle valve for adjusting an intake air amount of an internal combustion engine. The engine ECU 30 changes the torque generated by the internal combustion engine 32 by driving the engine actuator 31 so as to control a driving force of the own vehicle SV, to thereby be able to change an acceleration state (acceleration) of the own vehicle SV.

The brake ECU 40 is connected to a brake actuator 41. The brake actuator 41 adjusts, in response to an instruction from the brake ECU 40, a hydraulic pressure to be supplied to a wheel cylinder built in a brake caliper 42b of a friction brake mechanism 42 to press a brake pad onto a brake disk 42a using the hydraulic pressure so as to generate a friction brake force. Therefore, the brake ECU 40 controls the brake actuator 41 so as to control a braking force of the own vehicle SV, to thereby be able to change an acceleration state (deceleration) of the own vehicle SV.

The steering ECU 50 is a control unit of a well-known electric power steering system, and is connected to a motor driver 51. The motor driver 51 is connected to a steering motor 52. The steering motor 52 is incorporated into a "steering mechanism including a steering wheel, a steering shaft coupled to the steering wheel, a gear mechanism for steering, and the like" of the own vehicle. The steering motor 52 generates torque by electric power supplied from the motor driver 51, to thereby be able to add a steering assist torque to the steering mechanism or to steer the left and right steered wheels using the generated torque. That is, the steering motor 52 can change the steering angle of the own vehicle SV (turning angle of the steered wheels).

The steering ECU 50 is connected to a blinker lever switch (that is, a turn signal lever switch) 53. The blinker lever switch 53 is a detection switch for detecting an operation position of a blinker lever operated by the driver in order to activate (blink) a turn signal lamp 61 described later.

The blinker lever is provided on/to the steering column. The blinker lever is configured to be able to be operated/moved to two positions in the clockwise operation direction. One of the two position is a first step position to which the blinker lever is rotated from an initial position by a predetermined angle in the clockwise operation direction. The other of the two position is a second step position to which the blinker lever is rotated further from the first stage position by a predetermined angle in the clockwise operation direction. The blinker lever is configured to maintain its position at the first step position in the clockwise operation direction as long as the driver makes the blinker lever stay at the first step position in the clockwise operation direction. The blinker lever is configured to automatically return to the initial position when the driver releases his/her hand from the blinker lever. The blinker lever switch 53 outputs/generates to the steering ECU 50 a signal indicating that the blinker lever is maintained at the first step position in the clockwise operation direction when the blinker lever is at the first step position in the clockwise operation direction.

The blinker lever is configured to be able to be operated/moved to two positions in the counterclockwise operation direction. One of the two position is a first step position to which the blinker lever is rotated from an initial position by a predetermined angle in the counterclockwise operation direction. The other of the two position is a second step position to which the blinker lever is rotated further from the first stage position by a predetermined angle in the counterclockwise operation direction. The blinker lever is configured to maintain its position at the first step position in the counterclockwise operation direction as long as the driver makes the blinker lever stay at the first step position in the counterclockwise operation direction. The blinker lever is configured to automatically return to the initial position when the driver releases his/her hand from the blinker lever. The blinker lever switch 53 outputs/generates to the steering ECU 50 a signal indicating that the blinker lever is maintained at the first step position in the counterclockwise operation direction when the blinker lever is at the first step position in the counterclockwise operation direction. It should be noted that such a blinker lever is disclosed in, for example, Japanese Patent Application Laid-Open No. 2005-138647.

The DSECU measures a duration time for which the blinker lever is held at the first step position in the clockwise operation direction based on a signal transmitted from the blinker lever switch 53. Further, when the DSECU determines that the measured duration time is equal to or longer than a support request determination time (for example, 0.8 seconds) which has been set in advance, the DSECU is configured to determine that the driver is generating a request representing that the driver wants to receive the lane changing support in order to change lanes from the own lane to the right side lane of the own lane. Hereinafter the request also referred to as a "lane changing support request".

Further, the DSECU measures a duration time for which the blinker lever is held at the first step position in the counterclockwise operation direction based on a signal transmitted from the blinker lever switch 53. Further, when the DSECU determines that the measured duration time is equal to or longer than the support request determination time which has been set in advance, the DSECU is configured to determine that the driver is generating the lane changing support request in order to change lanes of the own vehicle from the own lane to the left side lane of the own lane.

The meter ECU 60 is connected to the left and right turn signal lamps 61 (turn indicator lamps/blinker lamps) and an information display 62.

The meter ECU 60 is configured to blink the left or right turn signal lamps 61 in response to a signal transmitted from the blinker lever switch 53 and an instruction transmitted from the DSECU or the like, through a winker drive circuit (not shown). For example, the meter ECU 60 blinks the left turn signal lamps 61 when the blinker lever switch 53 is outputting a signal indicating that the blinker lever is maintained at the first step position in the counterclockwise operation direction. Further, the meter ECU 60 blinks the right turn signal lamps 61 when the blinker lever switch 53 is outputting a signal indicating that the blinker lever is maintained at the first step position in the clockwise operation direction.

The information display 62 is a multi-information display provided in front of a driver's seat. The information display 62 displays various kinds of information in addition to measured values such as the vehicle speed and an engine rotation speed. For example, when the meter ECU 60 receives a display command corresponding to a driving support state from the DSECU, the meter ECU 60 causes the information display 62 to display a screen designated by the display command.

The display ECU 70 is connected to a buzzer 71 and a display unit 72. In response to the instruction transmitted from the DSECU, the display ECU 70 can cause the buzzer 71 to generate sounds to thereby alert the driver. Further, in response to the instruction transmitted from the DSECU, the display ECU 70 can cause the display unit 72 to light an attention mark (for example, a warming lamp), and/or to display an attention message and an operation situation of a driving support control. It should be noted the display unit 72 is a head-up display in this example, however, the display unit 72 may be another type of the display.

(Outline of Basic Driving Support Control)

As described above, the DSECU is configured to perform the following-travel inter-vehicle-distance control, the lane keeping control, and the lane changing support control. The lane keeping control is performed only when the following-travel inter-vehicle-distance control is being performed. The lane changing support control is performed only when the lane keeping control is being performed.

The following-travel inter-vehicle-distance control is a control for having the own vehicle travel to follow a preceding vehicle (that is, a following target vehicle) which travels in front (ahead) of the own vehicle while maintaining an inter-vehicle distance between the preceding vehicle and the own vehicle SV at a predetermined distance. The following-travel inter-vehicle-distance control is well known (for example, refer to Japanese Patent Application Laid-Open No. 2014-148293, No. 2006-315491, Japanese Patent No. 4172434, and Japanese Patent No. 4929777).

The lane keeping control is a control for applying the steering torque to the steering mechanism to change the steering angle of the own vehicle SV in such a manner that the position of the own vehicle SV is kept in the vicinity of a target traveling line (for example, the center line of the lane (own lane) in which the own vehicle SV travels) within the lane (own lane), so as to support the steering operation of the driver. The lane keeping control is well known (for example, refer to Japanese Patent Application Laid-Open No. 2008-195402, No. 2009-190464, No. 2010-6279, and Japanese Patent No. 4349210).

The lane changing support/assist control is a control for applying the steering torque to the steering mechanism to change the steering angle of the own vehicle SV in such a manner that the own vehicle SV is moved from the own lane (that is, an original lane) to "a lane adjacent to the original lane desired by the driver (that is, a target adjacent lane)", so as to support the steering operation (steering wheel operation for the lane change) of the driver. The lane changing support control is well known (for example, refer to Japanese Patent Application Laid-Open No. 2016-207060, and No. 2017-74823). For example, the lane changing support control is a control for setting "a target lateral position of the own vehicle SV" with reference to the center line of the original lane as a function of time t from a time point at which the lane changing support control starts in such a manner that the own vehicle SV is moved in the width direction of the road from the original lane to the target adjacent lane in a predetermined time (period), and for changing the steering angle of the own vehicle SV so as to have a lateral position of the own vehicle SV coincide with the target lateral position.

(Outline of Operation)

The DSECU determines whether or not the own vehicle SV can safely change lanes before performing the lane changing support control.

For example, the DSECU determines whether or not the three-dimensional object is present in the target adjacent lane, when the lane changing support request is generated while the lane keeping control is being performed and the execution of the lane changing support control is selected. Further, when the three-dimensional object is present in the target adjacent lane, the DSECU determines whether or not a position of the three-dimensional object is a position which is safe for the own vehicle SV when (assuming that) the own vehicle SV change lanes. In order to make such a determination, the DSECU needs to accurately acquire a relative position of the three-dimensional object (for example, the center position of the three-dimensional object), a relative longitudinal speed of the three-dimensional object, and a relative lateral speed of the three-dimensional object, with respect to the own vehicle SV. In addition to those, the DSECU needs to accurately acquire the shortest distance between each of end portions (the end portion in the width direction and the end portion in the length direction) of the three-dimensional object and the own vehicle SV. In order to acquire that shortest distance, the DSECU needs to acquire the width and length of the three-dimensional object.

In view of the above, the DSECU is configured to generate/form the above-described "fusion target object" to recognize the three-dimensional object present around the own vehicle SV and to acquire the above-described "fusion target object information (for example, "the length, the width, and the coordinate position" of the fusion target object)" as information of/on the three-dimensional object, using the formed fusion target object. Hereinafter, the outline of the operation of the present apparatus when the present apparatus acquires the fusion target object information will be described. It should be noted that the method of generating/forming and updating the fusion target object will be described much later.

The DSECU generates or updates the fusion target object by/through grouping (integrating) the sensor target objects detected by the peripheral radar sensor 16a according to grouping processes (processes for grouping) which will be described later, every time a predetermined calculation period (Δt) elapses. Further, the DSECU generates the fusion target object information of the fusion target object generated or updated based on the sensor target object information of the sensor target objects (that is, grouped sensor target objects) belonging to the fusion target object.

Meanwhile, all of the sensor target objects do not always have the accurate sensor target object information. That is, the accuracy of the sensor target object information degrades, for example, when the sensor target object is a target object (so-called a ghost target object) erroneously detected by the peripheral radar sensor 16a, and/or when the sensor target object information is erroneous information due to influence of noise.

In view of the above, the DSECU (or the peripheral radar sensor 16a) calculates/acquires "information indicative of a length of a period during which the sensor target object is continuously detected", which is referred to as an "AGE", for the sensor target object. More specifically, the DSECU sets a value of the "AGE" of the sensor target object which is detected for the first time to "0". Thereafter, every time one calculation period Δt elapses, when a sensor target object is detected and the detected sensor target object is the same as (is identical to) the sensor target object which was detected at the time point of the previous calculation time point, the DSECU increments (+1) the value of "AGE" for that sensor target object. In other words, the DSECU increments (+1) the value of "AGE" for a detected sensor target having the same identification information as the sensor target object which was detected at the time point of the previous calculation time point. When the sensor target object is the ghost target object or is detected due to the noise, the detected sensor target object has a low possibility of continuing to be detected (is unlikely to continue being detected) as the same target object for a long time. Therefore, the AGE for that detected sensor target object is unlikely to become large.

Further, the DSECU recognizes/identifies the sensor target object whose value of "AGE" is equal to or larger than a predetermined threshold as a "high AGE sensor target object". In other words, the DSECU recognizes the sensor target object which has been continuously detected for a time equal to or longer than the threshold time as the high AGE sensor target object. The DSECU recognizes/identifies the sensor target object whose value of "AGE" is smaller than the predetermined threshold as a "low AGE sensor target object".

Thereafter, the DSECU calculates at least the length Lf (hereinafter, also referred to as a "target object length Lf") of the fusion target object, the width Wf (hereinafter, also referred to as a "target object width Wf") of the fusion target object, and the position (Xf, Yf) of the fusion target object, all of which is included in the fusion target object information, using the "high AGE sensor target object" among the sensor target objects belonging to the fusion target object. It should be noted that the "high AGE sensor target object" is also referred to as a "first sensor target object" for convenience. The "low AGE sensor target object" is also referred to as a "second sensor target object" for convenience.

Figure 4:
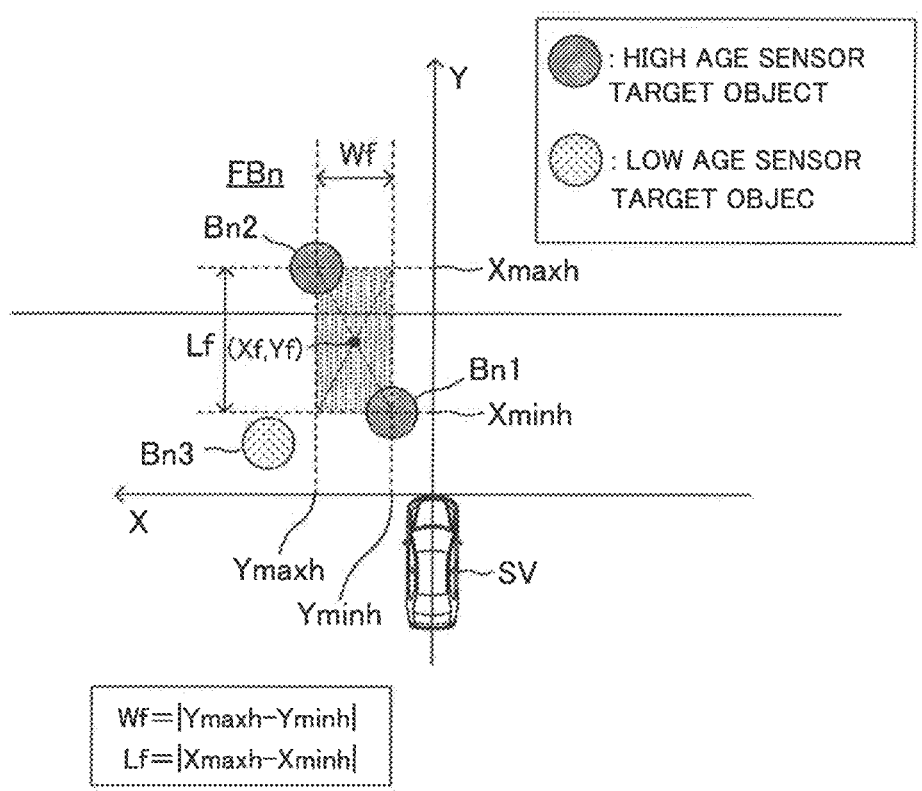
FIG. 4 is a diagram for explaining a method of calculating a target object width and a target object length.

In the example shown in FIG. 4, a fusion target object FBn has been generated/formed. The fusion target object FBn has been obtained through grouping (integrating) a sensor target object Bn1, a sensor target object Bn2, and a sensor target object Bn 3. Both of the sensor target object Bn1 and the sensor target object Bn2 are the high AGE sensor target objects. The sensor target object Bn3 is the low AGE sensor target object.

Therefore, the DSECU calculates "the target object length Lf, the target object width Wf, and the coordinate position (Xf, Yf)" of the fusion target object FBn, using "the sensor target object Bn1 and the sensor target object Bn2" which are the high AGE sensor target objects.

More specifically, the DSECU calculates a magnitude (=|Xmaxh−Xminh|) of a difference between a maximum longitudinal position Xmaxh and a minimum longitudinal position Xminh, as the target object length Lf. Here, the maximum longitudinal position Xmaxh is the "maximum value in the X coordinate positions Xobj of the high AGE target objects belonging to the fusion target object FBn". In the example of FIG. 4, the maximum longitudinal position Xmaxh is the X coordinate position Xobj of the sensor target object Bn2. The minimum longitudinal position Xminh is the "minimum value in the X coordinate positions Xobj of the high AGE target objects belonging to the fusion target object FBn". In the example of FIG. 4, the minimum longitudinal position Xminh is the X coordinate position Xobj of the sensor target Bn1.

Similarly, it is conceivable to calculate a magnitude (=|Ymaxh−Yminh|) of a difference between a maximum lateral position Ymaxh and a minimum lateral position Yminh, as the width Wf (target object width Wf) of the fusion target object FBn. Here, the maximum lateral position Ymaxh is the "maximum value in the Y coordinate positions Yobj of the high AGE target objects belonging to the fusion target object FBn". In the example of FIG. 4, the maximum lateral position Ymaxh is the Y coordinate position Yobj of the sensor target object Bn2. The minimum lateral position Yminh is the "minimum value in the Y coordinate positions Yobj of the high AGE target objects belonging to the fusion target object FBn". In the example of FIG. 4, the minimum lateral position Yminh is the Y coordinate position Yobj of the sensor target object Bn1.

However, even when the DSECU calculates the target object width Wf in the above-described conceivable manner, it has turned out that a situation occurs where the accuracy of the target object width Wf is not good. This point will be described/explained with reference to FIGS. 5A and 5B showing an example in which "a three-dimensional object 200 (for example, a track) having a large length L" is present in the left front of the own vehicle SV.

Figure 5A:
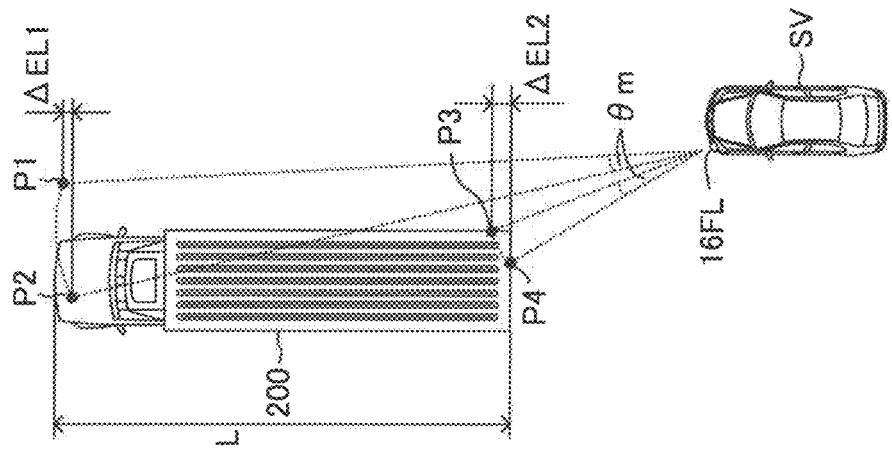
FIG. 5A is a plan view for explaining a magnitude of an error of a lateral position detected by the peripheral radar sensors.
Figure 5B:
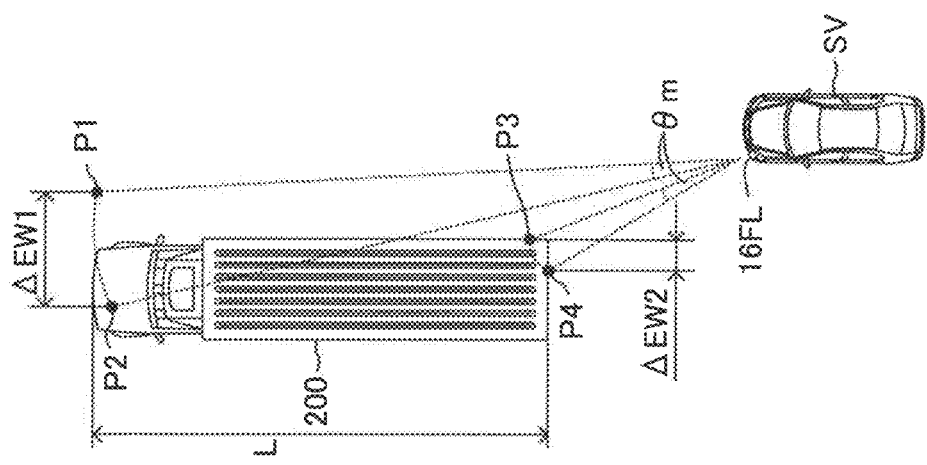
FIG. 5B is a plan view for explaining a magnitude of an error of a longitudinal distance detected by the peripheral radar sensors.

As understood from FIG. 5A, the peripheral radar sensor 16a (in this case, the left front peripheral sensor 16FL) detects each of the reflection points of the three-dimensional object 200 with (within) an error range of an angle Sm. Further, the peripheral radar sensor 16a has a tendency to preferentially detect corner portions of the three-dimensional object. Therefore, the Y coordinate position Yobj of the sensor target object used for obtaining/calculating the width of the three-dimensional object 200 fluctuates/varies within a range of a value ΔEW2 when the reflection point is in the vicinity of the own vehicle SV. In contrast, the Y coordinate position Yobj fluctuates/varies within a range of a "value ΔEW1 larger than the value ΔEW2" when the reflection point is far from the own vehicle SV. Thus, when the DSECU determines the minimum lateral position Yminh as described above, for example, the Y coordinate position Yobj of the point P1 may be selected as the minimum lateral position Yminh. In this case, a width of the three-dimensional object 200 (the width Wf of the fusion target object FBn corresponding to the three-dimensional object 200) greatly differs from the true width.

In contrast, as can be understood from FIG. 58B, the X coordinate position Xobj of the sensor target object used for obtaining/calculating the length of the three-dimensional object 200 fluctuates/varies within the range of the value ΔEL2 when the reflection point is in the vicinity of the own vehicle SV. The X coordinate position Xobj fluctuates/varies within the range of the value ΔEL1 when the reflection point is far from the own vehicle SV. The difference between the value ΔEL1 and the value ΔEL2 is small. Therefore, even when the DSECU determines both of the maximum longitudinal position Xmaxh and the minimum longitudinal position Xminh as in the manner described above to calculate (obtain) the length of the three-dimensional object 200 (the length Lf of the fusion target object FBn corresponding to the three-dimensional object 200), the length Lf does not greatly differ from the true length.

Figure 6A:
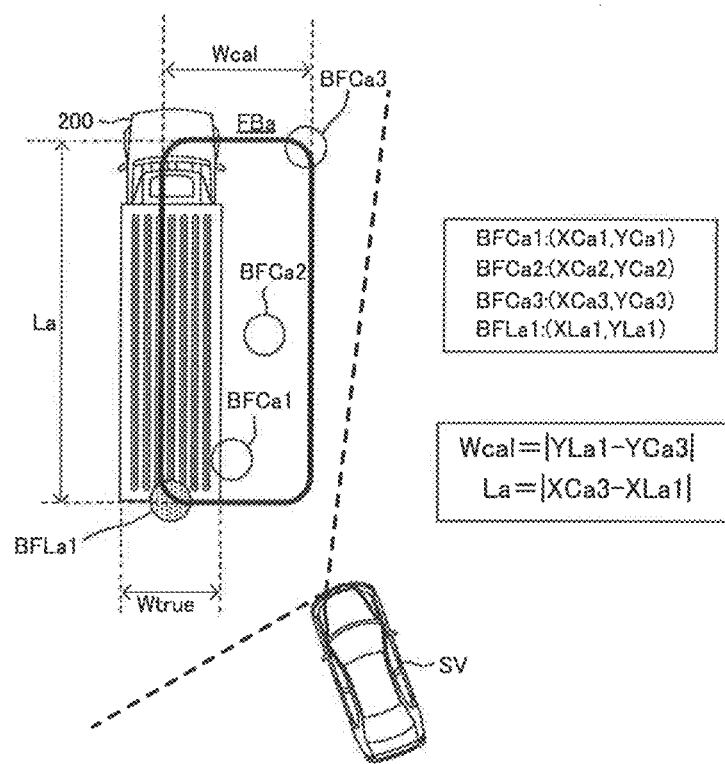
FIG. 6A is a plan view for explaining a reference example of a calculation method of a target object width and a target object length of a fusion target object.

A "method for obtaining/calculating the width Wf of the fusion target object FBn by the DSECU" which is found in consideration of the above described facts/matters will be described with reference to FIGS. 6A and 6B. In the example shown in FIGS. 6A and 6B, a fusion target object FBa has been generated/formed. The fusion target object FBa has been obtained through grouping/integrating a sensor target object BFCa1, a sensor target object BFCa2, a sensor target object BFCa3, and a sensor target object BFLa1. The sensor target object BFCa1, the sensor target object BFCa2 and the sensor target object BFCa3 are all the high AGE sensor target objects detected by the central front peripheral sensor 16FC. The sensor target object BFLa1 is the high AGE sensor target object detected by the left front peripheral sensor 16FL. The X-Y coordinate position (x, y) of each of the sensor target objects is as shown within a frame (block) in FIG. 6A.

As shown in FIG. 6 A, a magnitude Wcal (=|Ymaxh−Yminh|) of a difference between the maximum lateral position Ymaxh (=YLa 1) and the minimum lateral position Yminh (=YCa 3) among the high AGE target objects belonging to the fusion target object FBa greatly differs from an actual/true target object width Wtrue. The reason for this is that the Y coordinate position Yobj of the sensor target object which is far from the own vehicle SV may include a large detection error of the peripheral radar sensor 16a as described above.

In contrast, as described with reference to FIG. 5A, the detection error included in the Y coordinate position Yobj of the sensor target object which is in the vicinity of the own vehicle SV is small. In view of the above, in calculating the width Wf of the fusion target object, if there are a plurality of "high AGE sensor target objects belonging to the fusion target object" which are detected by a single one of the peripheral radar sensors 16a, the DSECU extracts/selects one high AGE sensor target object nearest/closest to the own vehicle SV among/from those high AGE sensor target objects to determine the maximum lateral position Ymaxh or the minimum lateral position Yminh, using the Y coordinate position Yobj of that selected high AGE sensor target object. Hereinafter, among "high AGE sensor target objects which belong to a certain fusion target object and which are detected by one (single) peripheral radar sensor 16a", the sensor target object which is closest to the own vehicle SV is also referred to as a "specific high AGE sensor target object".

Figure 6B:
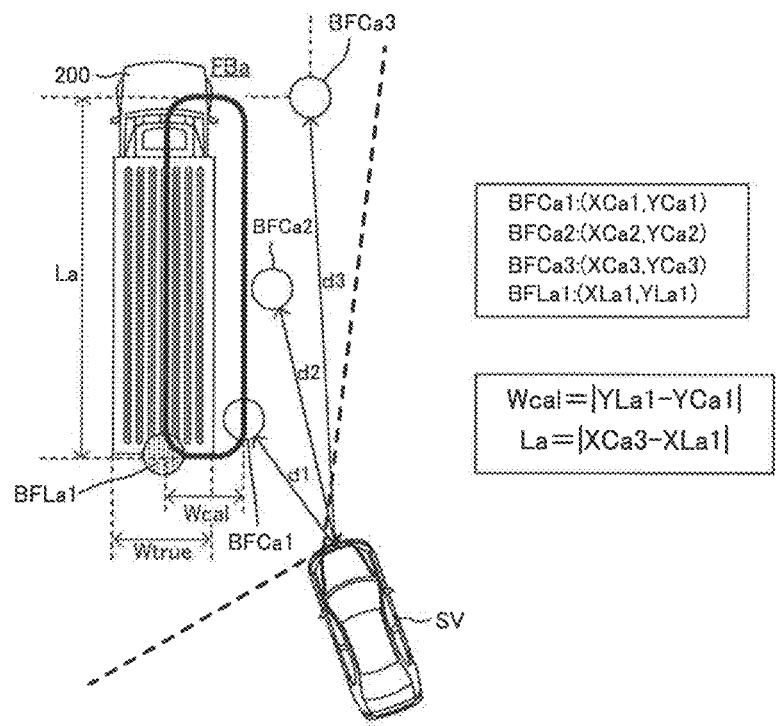
FIG. 6B is a plan view for explaining a calculation method of a target width and a target length of a fusion target object of a present apparatus.

For example, in the example shown in FIG. 6B, the DSECU selects the sensor target object BFCa1 as the "specific high AGE sensor target object". The sensor target object BFCa1 is a sensor target object which is closest to the own vehicle among "the sensor target object BFCa1, the sensor target object BFCa2, and the sensor target object BFCa3" which are detected by the (single) center front peripheral sensor 16FC. In other words, a distance d1 between the sensor target object BFCa1 and the own vehicle SV is smallest among distances dn (n=1, 2, 3) between each one of "the sensor target object BFCa1, the sensor target object BFCa2, and the sensor target object BFCa3" and the own vehicle. The specific high AGE sensor target object is also referred to as a "width calculation sensor target object". It should be noted that the distance dn is a linear (straight-line) distance between the own vehicle SV and the sensor target object, and can be calculated using an expression of $dn=(Xa^2+Ya^2)^{1/2}$, assuming that the X-Y coordinates of the sensor target object are (Xa, Ya).

The high AGE sensor target object detected by the left front peripheral sensor 16FL is the sensor target object BFLa1 only. In such a case, the DSECU selects this high AGE sensor target object BFLa1 as the specific high AGE sensor target object.

When two or more of the "specific high AGE sensor target objects" are selected, the DSECU determines/specifies the maximum value (largest value) in the Y coordinate positions Yobj of the selected specific high AGE sensor target objects as the maximum lateral position Ymaxh, and determines/specifies the minimum value (smallest value) in the Y coordinate positions Yobj of the selected specific high AGE sensor target objects as the minimum lateral position Yminh. Thereafter, the DSECU calculates the magnitude (=|Ymaxh−Yminh|) of the difference between the maximum lateral position Ymaxh and the minimum lateral position Yminh, as (so as to obtain) the width Wf of the fusion target object FBn.

In the example shown in FIG. 6B, the specific high AGE sensor target objects are two of the sensor target object BFCa1 and the sensor target object BFLa1. Thus, the DSECU determines that the maximum lateral position Ymaxh is equal to the Y coordinate position (=YLa1) of the sensor target object BFLa1 and the minimum lateral position Ymin is equal to the Y coordinate position (=YCa1) of the sensor target object BFCa1. Therefore, the DSECU calculates Wcal=|YLa1−YCa1| as the target object width Wf of the fusion target object FBa. As is apparent from FIG. 6B, the target object width Wf thus calculated is a value close to the actual/true target object width Wtrue.

As described above, it should be noted that the DSECU selects, as the maximum longitudinal position Xmaxh, the maximum value (=XCa3) among the X coordinate positions (Xobj) of all of the high AGE target objects belonging to the fusion target object FBa. Further, the DSECU selects, as the minimum longitudinal position Xminh, selects the minimum value (=XLa1) among the X coordinate positions Xobj of all of the high AGE target objects belonging to the fusion target object FBa. Thereafter, the DSECU calculates the magnitude of the difference (=|Xmaxh−Xminh|) as the target object length La of the fusion target object FBa.

Further, the DSECU calculates, as the X coordinate position Xfn of the fusion target object FBn, a center position between the "X coordinate position Xobj of the sensor target object selected as the sensor target object which specifies the maximum longitudinal position Xmaxh" and the "X coordinate position Xobj of the sensor target object selected as the sensor target object which specifies the minimum longitudinal position Xminh". Similarly, the DSECU calculates, as the Y coordinate position Yfn of the fusion target object FBn, a center position between the "Y coordinate position Yobj of the sensor target object selected as the sensor target object which specifies the maximum lateral position Ymaxh and the "Y coordinate position Yobj of the sensor target object selected as the sensor target object which specifies the minimum lateral position Yminh". In addition, the DSECU calculates, as the longitudinal relative speed Vxfn of the fusion target object FBn, an "average value of the longitudinal relative speeds" of the high AGE sensor target objects belonging to the fusion target object FBn. Similarly, the DSECU calculates, as the lateral relative speed Vyfn of the fusion target object FBn, an "average value of the lateral relative speeds" of the high AGE sensor target objects belonging to the fusion target object FBn.

In the example shown in FIG. 6B, there are two or more of the specific high AGE sensor target objects. In contrast, when the number of the specific high AGE sensor target object is one (that is, only one of the specific high AGE sensor target object is present), the DSECU sets the target object width Wf of the fusion target object to a predetermined fixed width W, and sets the target object length Lf of the fusion target object to a predetermined fixed length L. Further, in this case, the DSECU sets "the X-Y coordinate position, the longitudinal relative speed Vxfn, and the lateral relative speed Vyfn" of the fusion target object FBn to "the X-Y coordinate position, the longitudinal relative speed, and the lateral relative speed" of that one specific high AGE sensor target object, respectively.

In addition, in a case where the high AGE sensor target object in the sensor target objects belonging to the fusion target object is not present, when that fusion target object is generated/formed based on an predicted/estimated target object described later, the DSECU sets "the X-Y coordinate position, the target object width Wf, the target object length Lf, the longitudinal relative speed, and the lateral relative speed" of the fusion target object to the "X-Y coordinate position, the target object width, the length, the longitudinal relative speed, and the lateral relative speed" of the estimated target object, respectively.

Furthermore, when there is no high AGE sensor target object in the sensor target objects belonging to the fusion target object, and that fusion target object has not been generated/formed based on the estimated target object described later, the DSECU sets "the target object width Wf and the target object length Lf" of that fusion target object to "a predetermined fixed width and a predetermined length", respectively. Further, in this case, the DSECU sets ""the X-Y coordinate position, the longitudinal relative speed and the lateral relative speed" of the fusion target object to "the X-Y coordinate position, the longitudinal relative speed, and the lateral relative speed" of the sensor target object having the largest AGE among the sensor target objects belonging to the fusion target object, respectively.

(Generating/Updating Fusion Target Object, and Lost Determination)

Next, a method of generating/updating the fusion target object, and a method of lost determination, performed by the DSECU, will be described.

The DSECU acquires the sensor target object information from the peripheral radar sensors 16a, every time a predetermined time Δt (calculation period) elapses. A target object detection range of any specific one of the peripheral radar sensors 16a partially overlaps with a target object detection range of one of the peripheral radar sensors 16a other than the specific one. Further, even when only one three-dimensional object is present around the own vehicle SV, each of the peripheral radar sensors 16a may recognize/detects a plurality of the sensor target objects from that single three-dimensional object in some cases. For the reasons described above, a case sometimes occurs where plurality of the sensor target objects are acquired from one (single) three-dimensional object.

In this case, the DSECU performs grouping processes (or processes for grouping) described later to group (integrate, fuse) "the sensor target objects that are highly likely to be obtained from one three-dimensional object n", to thereby generate/form the fusion target object FBn corresponding to that one three-dimensional object n. In other words, the DSECU integrates the sensor target objects based on the respective sensor target object information of the sensor target objects to generate the fusion target object FBn. Thereafter, as described above, the DSECU generates/acquires the fusion target object information of the fusion target object FBn based on the sensor target object information of the high AGE sensor target objects among (selected from) the sensor target objects that are integrated into the fusion target object FBn (that is, that belong to the fusion target object FBn). Hereinafter, the "grouping processes" will be described in detail, using the examples shown in FIGS. 7A and 7B.

Figure 7A:
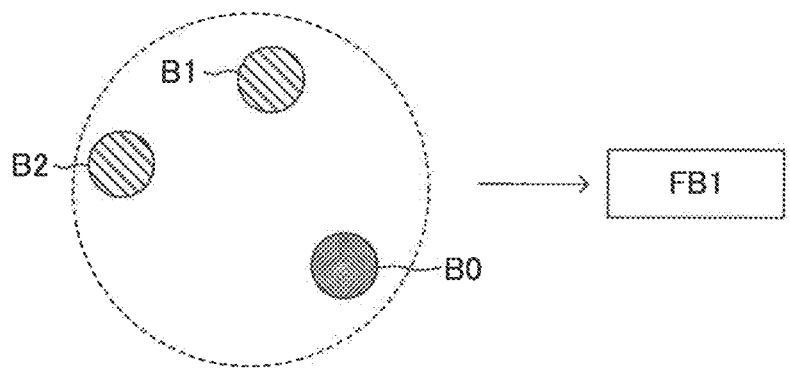
FIG. 7A is a diagram for explaining a grouping processes for integrating sensor target objects.

As shown in FIG. 7A, it is assumed that sensor target objects B0, B1 and B2 are detected. In this example, the sensor target object B0 has been detected by the right front peripheral sensor 16FR, and both of the sensor target object B1 and the sensor target object B2 have been detected by the central front peripheral sensor 16FC. Further, in this example, a fusion target object has not been generated/formed yet up to the present time point (in other words, a fusion target object had not been generated at the time point of the previous calculation which is a calculation performed the calculation time period Δt before).

When the fusion target object FBn has not been generated at a time point of starting the present calculation as in the example shown in FIG. 7A, the DSECU carries out the grouping processes for generating/forming a new fusion target object FBn as described below. It should be noted that this grouping processes are referred to as "new target object generation grouping processes".

Firstly, the DSECU selects an arbitrary sensor target object (for example, the sensor target object B0) as a grouping reference target object Bs from a plurality of the sensor target objects (for example, the sensor target objects B0 to B2). Next, the DSECU determines whether or not the "sensor target object(s) Bn (for example, the sensor target object(s) Bn, n=1, 2) other than the grouping reference target object Bs" serving as a grouping candidate satisfies both of the following conditions (condition G1 and condition G2) with respect to the grouping reference target object Bs (for example, the sensor target object B0). When the sensor target object Bn of the grouping candidate satisfies both of the following conditions (condition G1 and condition G2), it is determined that the sensor target object Bn satisfies grouping conditions.

The Condition G1: Condition using positions as criterions for determination.

Figure 7B:
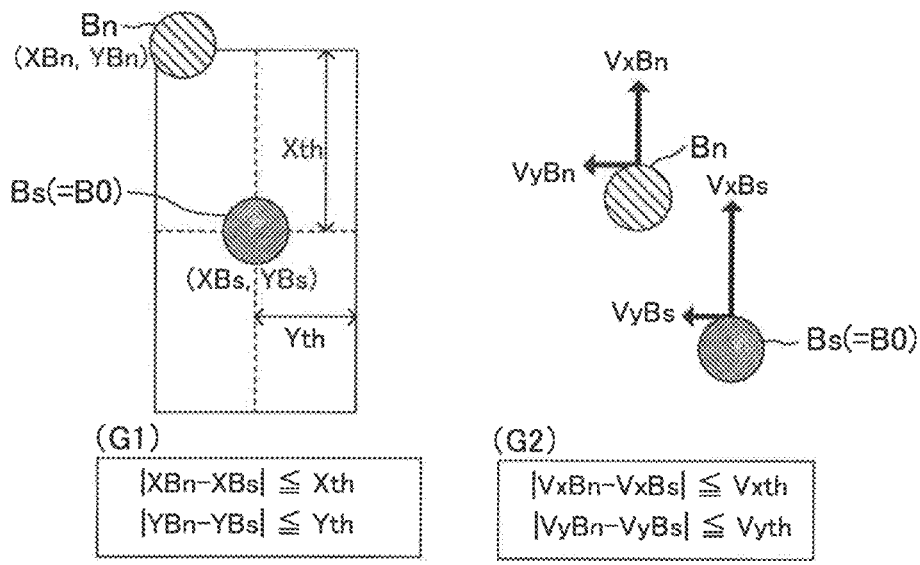
FIG. 7b is a diagram for explaining the grouping processes for integrating the sensor target objects.

The condition G1 is a condition satisfied when, as shown in the left side of FIG. 7B, an absolute value of a difference (=|XBn−XBs|) between "the X coordinate position Xobj (=XBn) of the sensor target object Bn which is the grouping candidate" and "the X coordinate position Xobj (=XBs) of the grouping reference target object Bs" is equal to or smaller than a predetermined threshold longitudinal distance Xth, and an absolute value of a difference (=|YBn−YBs|) between "the Y coordinate position Yobj (=YBn) of the sensor target object Bn which is the grouping candidate" and "the Y coordinate position Yobj (=YBs) of the grouping reference target object Bs" is equal to or smaller than a predetermined threshold lateral distance Yth.

Here, the threshold longitudinal distance Xth is equal to a value of "a target object length L0×0.5+a predetermined value α" (that is, Xth=L0×0.5+α).

The threshold lateral distance Yth is equal to a value of "a target object width W0×0.5+a predetermined value β" (that is, Yth=W0×0.5+β).

An arbitrary fixed values suitable for the condition G1 are used for the target object length L0 and the target object width W0. For example, a standard length of a motorcycle is used as the target object length L0, and a standard width of the motorcycle is used as the target object width W0.

The Condition G2: Condition using speeds as criterions for determination.

The condition G2 is a condition satisfied when, as shown in the right side of FIG. 7B, an absolute value of a difference (=|VxBn−VxBs|) between "the longitudinal relative speed Vxobj (=VxBn) of the sensor target object Bn which is the grouping candidate" and "the longitudinal relative speed Vxobj (=VxBs) of the grouping reference target object Bs" is equal to or smaller than a predetermined longitudinal relative speed difference threshold Vxth, and an absolute value of a difference (=|VyBn−VyBs|) between "the lateral relative speed Vyobj (=VyBn) of the sensor target object Bn which is the grouping candidate" and "the lateral relative speed Vyobj (=VyBs) of the grouping reference target object Bs" is equal to or smaller than a predetermined lateral relative speed difference threshold Vyth.

It should be noted that the DSECU may determine whether or not the condition G2 is satisfied, using the absolute speeds. That is, the condition G2 may be a condition satisfied when:

an absolute value of a difference between "the longitudinal absolute speed of the sensor target object Bn which is the grouping candidate" and "the longitudinal absolute speed of the grouping reference target object Bs" is equal to or smaller than a predetermined longitudinal speed difference threshold Vxth, and an absolute value of a difference between "the lateral absolute speed of the sensor target object Bn which is the grouping candidate" and "the lateral absolute speed of the grouping reference target object Bs" is equal to or smaller than a predetermined lateral speed difference threshold Vyth.

When the sensor target object Bn serving as a grouping candidate satisfies both of the condition G1 and the condition G2 for (with respect to) the grouping reference target object Bs, the DSECU fuses (integrates/merges) the sensor target object Bn and the grouping reference target object Bs to newly generate/form a fusion target object FBn. Further, the DSECU assigns (provides/gives) "identification information (ID) for distinguishing (identifying) that newly formed fusion target object FBn from fusion target object(s) excluding that newly formed fusion target object FBn" to that newly formed fusion target object FBn.

For example, for the example shown in in FIG. 7A, it is assumed that the sensor target object B1 serving as the grouping candidate satisfies both the conditions (the condition G1 and the condition G2) for (with respect to) the grouping reference target object B0. In this case, the DSECU newly generates/forms the fusion target object FB1 through fusing/integrating the sensor target object B1 and the sensor target object B0. The identification information of/for the fusion target object FB1 is, for example, "ID1".

Further, in FIG. 7A, when the sensor target object B2 serving as the grouping candidate also satisfies both of the conditions (the condition G1 and the condition G2) for (with respect to) the grouping reference target object B0, the DSECU also fuses/integrates the sensor target object B2 and the sensor target object B0. That is, the sensor target object B2 is fused/integrated into the fusion target object FB1.

In contrast, when the sensor target object Bn serving as the grouping candidate does not satisfy at least one of the conditions (the condition G1 and the condition G2) for (with respect to) the grouping reference target object Bs, the DSECU selects/designates the sensor target object Bn as another grouping reference target object Bs. Thereafter, the DSECU determines whether or not a sensor target object serving as a grouping candidate (which is a sensor target object which has not been fusedmintegrated into the fusion target object before that time point) satisfies both of the conditions (the condition G1 and the condition G2) for (with respect to) that designated another grouping reference target object Bs. The above processes are the new target object generation grouping processes.

Figure 8A:
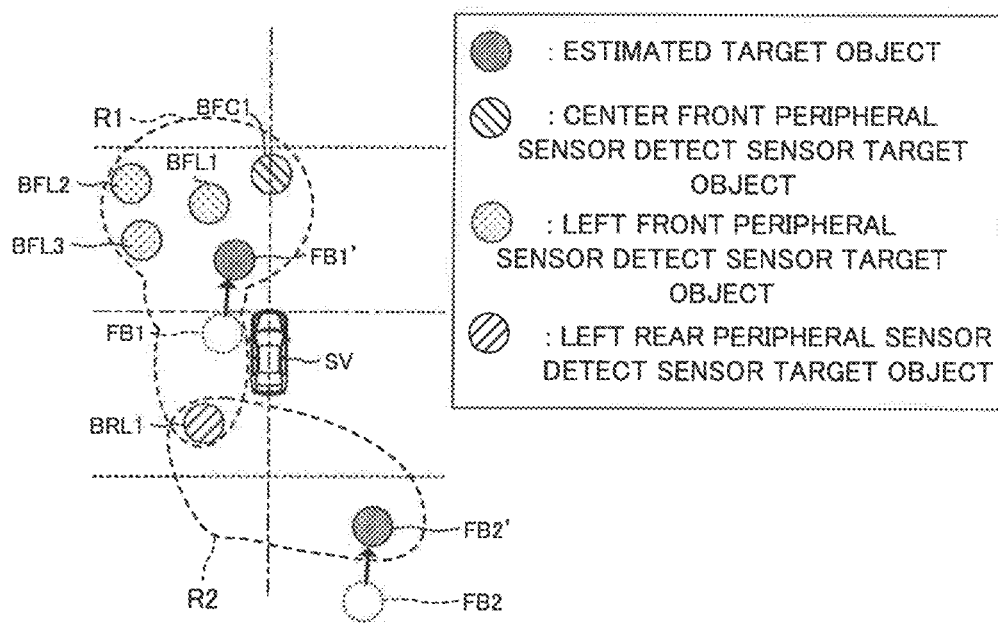
FIG. 8A is a diagram for explaining the grouping processes for integrating the sensor target objects.

On the other hand, when a fusion target object FBn has already been generated/formed before the present time point (in other words, a fusion target object FBn had been generated at the time point of the previous calculation which is a calculation performed the calculation time period Δt before), the DSECU updates the fusion target object FBn as follows. That is, when the fusion target object FBn is present at the time point of starting the present calculation, the DSECU updates this fusion target object FBn as follows. Hereinafter, as shown in FIG. 8A, the method of updating (generating) the fusion target object will be explained, using an example in which two of fusion target objects FB1 and FB2 (that is, FBn, n=1, 2) have already been generated/ formed at the time point of starting the present calculation. The fusion target object generated or updated in the previous calculation is referred to as a "previous fusion target object", and target object information of/on the previous fusion target object is referred to as "previous fusion target object information".

The DSECU estimates/extrapolate "a position and a relative speed" of the fusion target object FBn at the time point of the present calculation, based on the previous fusion target object information. The estimated/extrapolated fusion target object is referred to as an "estimated target object FBn'." For example, in the example shown in FIG. 8A, the estimated target objects FB1' and FB2' are generated based on the previous fusion target objects FB1 and FB2, respectively.

More specifically, for descriptive purposes, in the X-Y coordinate (hereinafter referred to as a "previous X-Y coordinate") at the time point of the previous calculation, the X-Y coordinate position of the previous fusion target object FBn is expressed as (Xfn, Yfn), the longitudinal relative speed of the previous fusion target object FBn is expressed as Vxfn, and the lateral relative speed of the previous fusion target object FBn is expressed as Vyfn.

In this case, the DSECU calculates the X-Y coordinate position (Xfn', Yfn') of the estimated target object FBn' in the previous X-Y coordinate according to the following expression.

$Xfn' = Xfn + \Delta t \cdot Vxfn$ $Yfn' = Yfn + \Delta t \cdot Vyfn$

Thereafter, the DSECU converts (performs a coordinate transformation) the calculated "position (Xfn', Yfn') of the estimated target object FBn' in the previous X-Y coordinate" to the X-Y coordinate position in the X-Y coordinate (hereinafter referred to as a "present X-Y coordinate") at the time point of the present calculation. Further, the DSECU converts (performs a coordinate transformation) the "relative speed (Vxfn, Vyfn) of the previous fusion target object FBn" in the previous X-Y coordinate to a "relative speed in the present X-Y coordinate" to set a "relative speed of the estimated target object FBn' in the present X-Y coordinate" to that converted relative speed. It should be noted that, for example, the DSECU recognizes a relationship between the previous X-Y coordinate and the present X-Y coordinate based on "the vehicle speed V, the lateral deviation Dy, and the yaw angle θy" of the own vehicle SV as well as the time θt to perform the coordinate transformation of "the X-Y coordinate position and the relative speed" based on the relationship.

Further, the DSECU sets the "target object width and target object length" of the estimated target object FBn' to the same respective values as the "target object width Wf and the target object length Lf" of the previous fusion target object FBn. In this manner described above, the DSECU generates/forms the estimated target objects FBn' (i.e., FB1' and FB2').

The estimated target objects FBn' is a target object serving as a reference for grouping (integrating/fusing) a sensor target object (hereinafter also referred to as a "present detected sensor target object") which is newly detected at the time point of the present calculation. Therefore, the identification information of the estimated target object FBn' is set to the same information as the identification information of the previous fusion target object FBn. That is, for example, the identification information of the estimated target object FB1' is maintained at "ID1", which is the same as the identification information of the previous fusion target object FB1. The identification information of the estimated target FB2' is maintained at "ID2", which is the same as the identification information of the previous fusion target object FB2.

Next, the DSECU selects/extracts the present sensor target object which is qualified to be the grouping candidate for the estimated target object FBn'. This selection/extraction is performed based on the position of the estimated target object FBn'. More specifically, the DSECU selects/extracts, as a grouping target of/for the estimated target object FBn', a "present detected sensor target object" which is present within a grouping target area/region determined based on the position of the estimated target object FBn'.

In the example shown in FIG. 8A, the sensor target object BFC1 is the present detected sensor target object detected by the central front peripheral sensor 16FC at the present time point. The sensor target objects BFL1, BFL2, and BFL3 are the present detected sensor target objects detected by the left front peripheral sensor 16FL at the present time point. The sensor target object BRL1 is the present detected sensor target object detected by the left rear peripheral sensor 16RL at the present time point. Neither the right front peripheral sensor 16FL nor the right rear peripheral sensor 16RR detects a present detected sensor target object at the present time point. Therefore, the grouping candidates for the estimated target object FB1' are "the sensor target object BFC1, the sensor target objects BFL1, BFL2 and BFL3, and the sensor target object BRL1" present in the grouping target area/region (those objects are surrounded by a dotted line R1). The grouping candidate for the estimated target object FB2' is "the sensor target object RL1" present in the grouping target area (the object is surrounded by a dotted line R2).

The DSECU carries out grouping processes (hereinafter, referred to as a "first grouping process") for associating (linking) the "present detected sensor target object which has been designated as the grouping candidate of the estimated target object FBn'" with (to) the "previous fusion target object FBn", based on the estimated target object FBn'.

That is, the DSECU firstly selects/designates the estimated target object FBn' as the grouping reference target object. Next, the DSECU determines whether or not the present detected sensor target object designated as the grouping candidate satisfies the grouping condition consisting of the above condition G1 and condition G2 for (with respect to) the grouping reference target object (that is, the estimated target object FBn'). The target object information (the X-Y coordinate position, the longitudinal relative speed, and the lateral relative speed) of the estimated target object FBn' is used as the target object information of the grouping reference target object, when the grouping reference target object is the grouping reference target object. In the first grouping process, the threshold longitudinal distance Xth used in the condition G1 is a value of "a target object length L1×0.5+a predetermined value α" (that is, Xth=L1×0.5+α), and the threshold lateral distance Yth used in the condition G2 is a value of "a target object width W1×0.5+a predetermined value β" (that is, Yth=W1×0.5+β). "The target object length and the target object width" of the estimated target object FBn' are used for the target object length L1 and the target object width W1, respectively.

When the present detected sensor target object designated as the grouping candidate satisfies the grouping condition consisting of both of the conditions condition G1 and condition G2 for (with respect to) the estimated target object FBn' designated/selected as the grouping reference target object, the DSECU fuses/integrates the estimated target object FBn' and that present detected sensor target object to update (generate) the fusion target object FBn. The DSECU performs the processes described above for all of the present detected sensor target objects designated as the grouping candidates to update the fusion target object FBn. The identification information of this updated fusion target object FBn is maintained at the same information as the identification information of the estimated target object FBn'. As a matter of course, when the present detected sensor target object designated as the grouping candidate does not satisfy at least one of the conditions (the condition G1 and the condition G2) for (with respect to) the estimated target object FBn' designated as the grouping reference target object, the DSECU does not fuse/integrate the estimated target object FBn' and this present detected sensor target objects.

Figure 8B:
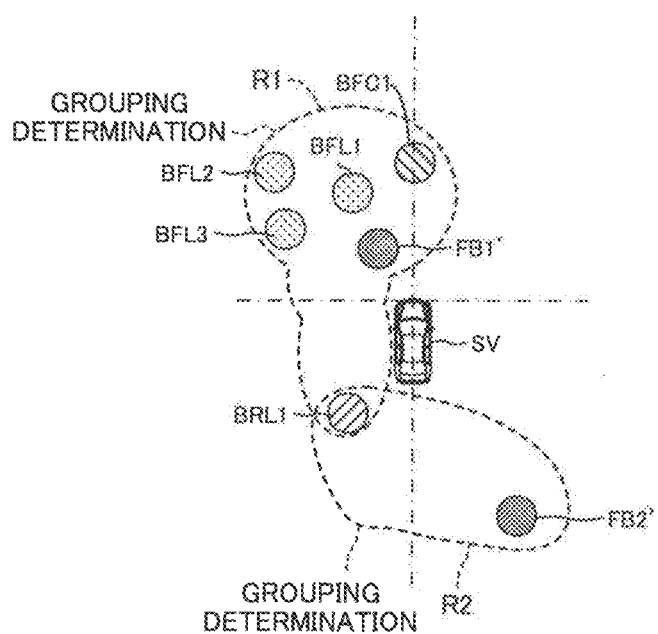
FIG. 8B is a diagram for explaining the grouping processes for integrating the sensor target objects.
Figure 9:
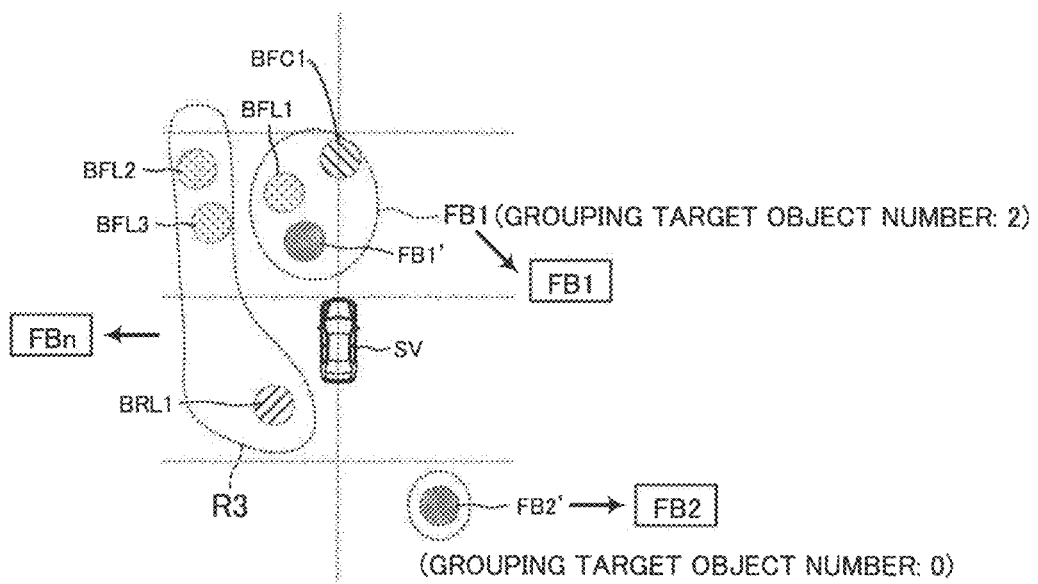
FIG. 9 is a diagram for explaining the grouping processes for integrating the sensor target objects.

In the example shown in FIG. 8B, it is assumed that the sensor target object BFC1 and the sensor target object BFL1 among the present detected sensor target objects designated as the grouping candidates (refer to the objects surrounded by the dotted line R1) satisfies both of the conditions (the condition G1 and the condition G2, that is, the grouping conditions) for (with respect to) the estimated target object FB1'. In this case, as shown in FIG. 9, the DSECU fuses/integrates the estimated target object FB1' and "the sensor target object BFC1 and the sensor target object BFL1" to update (generate) the fusion target object FB1. Therefore, the number of sensor target objects (the number is referred to as the "grouping target object number") determined to be fused/integrated into the estimated target object FB1' is "2".

Further, in the example shown in FIG. 8B, it is assumed that the sensor target object BRL1 designated as the grouping candidate does not satisfy the grouping conditions for (with respect to) the estimated target object FB2'. That is, there is no sensor target object satisfying the grouping conditions among the present detection target objects that are the grouping candidate surrounded by the dotted line R2 for (with respect to) the estimated target object FB2'. Thus, the number (the grouping target object number) of sensor target objects determined to be fused/integrated into the estimated target object FB2' is "0". In this case, the DSECU obtains the present fusion target object FB2 through extrapolation. That is, the DSECU regards/considers the estimated target object FB2' as the present fusion target object FB2 which is to be obtained by extrapolating the previous fusion target object FB2, and replaces the target object information of the present fusion target object FB2 with the target object information of the estimated target object FB2'. This process is referred to as an "extrapolation of the fusion target object" or an "extrapolation process of the fusion target object".

Further, when there is at least the present detected sensor target object (hereinafter, also referred to as a "residual sensor target object") which has not been fused/integrated to any of the estimated target objects through the first grouping process, the DSECU attempts to group the residual sensor target object(s). This processes is referred to as a "second grouping process".

For example, in the example shown in FIG. 9, the "sensor target objects BFL2 and BFL3, and the sensor target object BRL1" surrounded by the dotted line R3 are the residual sensor target objects. The DSECU performs the same processes as the above-described "new target object generation grouping processes" as the second grouping process, for those residual sensor target objects.

That is, the DSECU selects/designates one of the residual sensor target objects as the grouping reference target object and selects/extracts a residual sensor target object(s) which is qualified to be a grouping candidate for (with respect to) the selected/designated grouping reference target object. It should be noted that the DSECU may select/designate one of the residual sensor target objects as the grouping reference target object and treat all of the residual sensor target object(s) excluding the selected/designated grouping reference target object as the grouping candidate(s) regardless of the position of the selected/designated grouping reference target object. Next, the DSECU determines whether or not the residual sensor target object selected/designated as the extracted grouping candidate satisfies the above grouping conditions for (with respect to) the selected/designated grouping reference target object. Thereafter, the DSECU fuses/integrates the grouping reference target object and the residual sensor target object which satisfies the grouping conditions to generate/form a new fusion target object FBn The DSECU assigns identification information (ID) for distinguishing (identifying) the new fusion target object FBn from the fusion target objects excluding the new fusion target object FBn to the new fusion target object FBn. The DSECU performs the processes described above for all of the residual sensor target objects.

Incidentally, as the previous fusion target object FB2 described above, when there is no sensor target object (present detected sensor target object) which can be fused/integrated to the "estimated target object FBn' corresponding to the previous fusion target object FBn" through the first grouping process, it can be considered that the three-dimensional object corresponding to the previous fusion target object FBn is no longer present around the own vehicle SV. That is, when the grouping target object number (that is, the number of present detected sensor target objects that can be fused/integrated to the estimated target object FBn') is "0", it can be considered that the fusion target object FBn has been lost.

Figure 10:
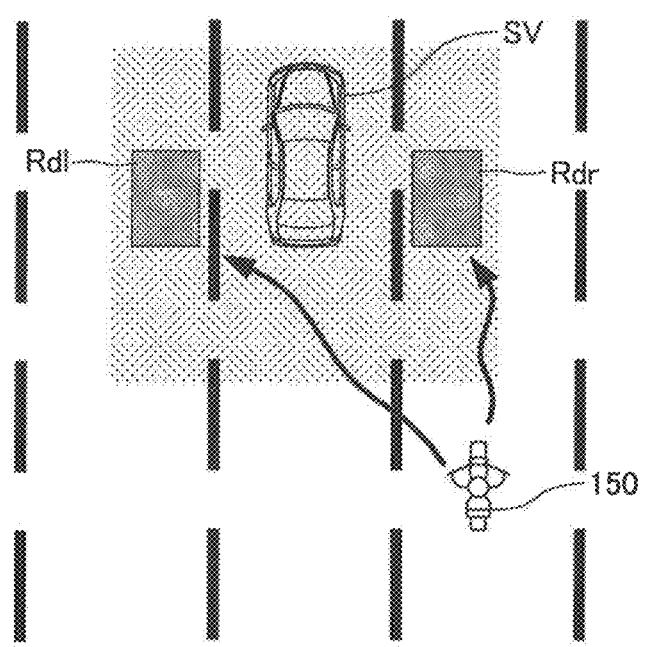
FIG. 10 is a plan view for illustrating the own vehicle, a three-dimensional object, and a road for explaining extrapolation of the fusion target object.

However, such a situation may arise, as shown in FIG. 10, when a three-dimensional object 150 which has been detected as the fusion target object FB2 by the DSECU temporarily enters blind spot areas Rdr or Rdl where the millimeter waves are not radiated from any of the peripheral radar sensors 16a. That is, there is a relatively high possibility that such a situation occurs when the three-dimensional object 150 corresponding to the fusion target object FB2 is actually present around the own vehicle SV, but no sensor target object is detected from that three-dimensional object 150.

Therefore, if the DSECU determines that the fusion target object FBn has lost immediately after the grouping target object number with respect to the estimated target object FBn' becomes "0", that determination made by the DSECU may be erroneous.

In order to avoid such an erroneous determination, the DSECU forms/generates the present fusion target object FBn through the extrapolation based on the previous fusion target object (in other words, the estimated target object FBn), when the grouping target object number with respect to the estimated target object FBn' is "0". The extrapolation of the fusion target object continues being performed until a duration (extrapolation duration) from the start of the extrapolation reaches a predetermined maximum extrapolation duration tg. That is, the extrapolation of the fusion target object is terminated when the extrapolation duration reaches the maximum extrapolation duration tg. It should be noted that the extrapolation of the fusion target object is terminated even before the extrapolation duration reaches the maximum extrapolation duration tg, when the sensor target object appears which can be fused/integrated to the estimated target object corresponding to the extrapolated fusion target object, and that sensor target object is fused/integrated to that estimated target object.

When the three-dimensional object which has temporarily entered into one of "the blind spot area Rdr and the blind spot area Rdl" of the peripheral radar sensor 16a comes out from that blind spot area, the sensor target object can be detected which satisfies the grouping conditions for (with respect to) the estimated target object corresponding to the extrapolated fusion target object. In this case, the DSECU fuses/integrates the detected sensor target object and the estimated target object to form/generate a fusion target object and finishes the extrapolation of the fusion target object. Those processes can reduces a possibility of occurrence of the erroneous determination described above.

In contrast, when the sensor target object which can satisfy the grouping conditions for (with respect to) the estimated target object corresponding to the extrapolated fusion target has not been detected before the time point at which extrapolation duration becomes equal to or longer than the maximum extrapolation duration tg, it is unlikely that the three-dimensional object corresponding to that fusion target object (the extrapolated fusion target) has been present temporarily within the blind spot area, but rather, it is highly likely that it is no longer present around the own vehicle SV. Therefore, in this case, the DSECU determines that the fusion target object has been lost.

(Specific Operation)

Next, specific operations of the present apparatus will be described. When a predetermined timing arrives, the CPU of the DSECU executes routines shown in FIGS. 11, 12, and 14, every time the predetermined time (predetermined calculation period) Δt elapses.

Figure 11:
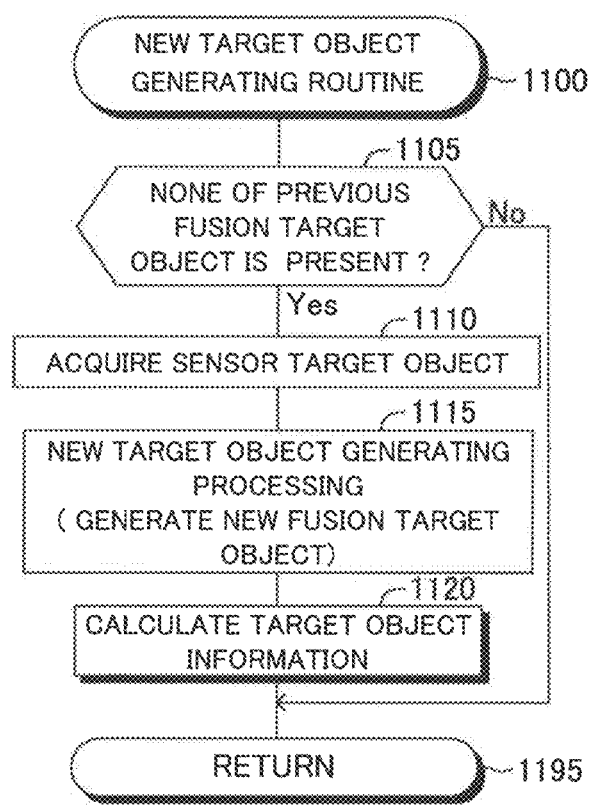
FIG. 11 is a flowchart for illustrating a routine executed by a CPU of the driving support ECU shown in FIG. 1.

Therefore, when an appropriate timing arrives, the CPU starts processing from step 1100 of a new target object generating routine of FIG. 11, and proceeds to step 1105 to determine whether none of the above-described previous fusion target object is present. In other words, at step 1105, the CPU determines whether the fusion target object has neither been generated nor updated at the time point of the previous calculation (one calculation period Δt before). When none of the previous fusion target object is present, the CPU sequentially executes processes of steps 1110 to 1120 described below, and then proceeds to step 1195 to tentatively terminate the present routine.

Step 1110: the CPU acquires the sensor target object (that is, the present detected sensor target object) detected by the peripheral radar sensor 16a at the time point of the present calculation. Although not shown in the figure, when no sensor target object is acquired at step 1110, the CPU proceeds directly to step 1195 to tentatively terminate the present routine.

Step 1115: the CPU executes the above-described new target object generation grouping processes to generate the new fusion target object.

Figure 15:
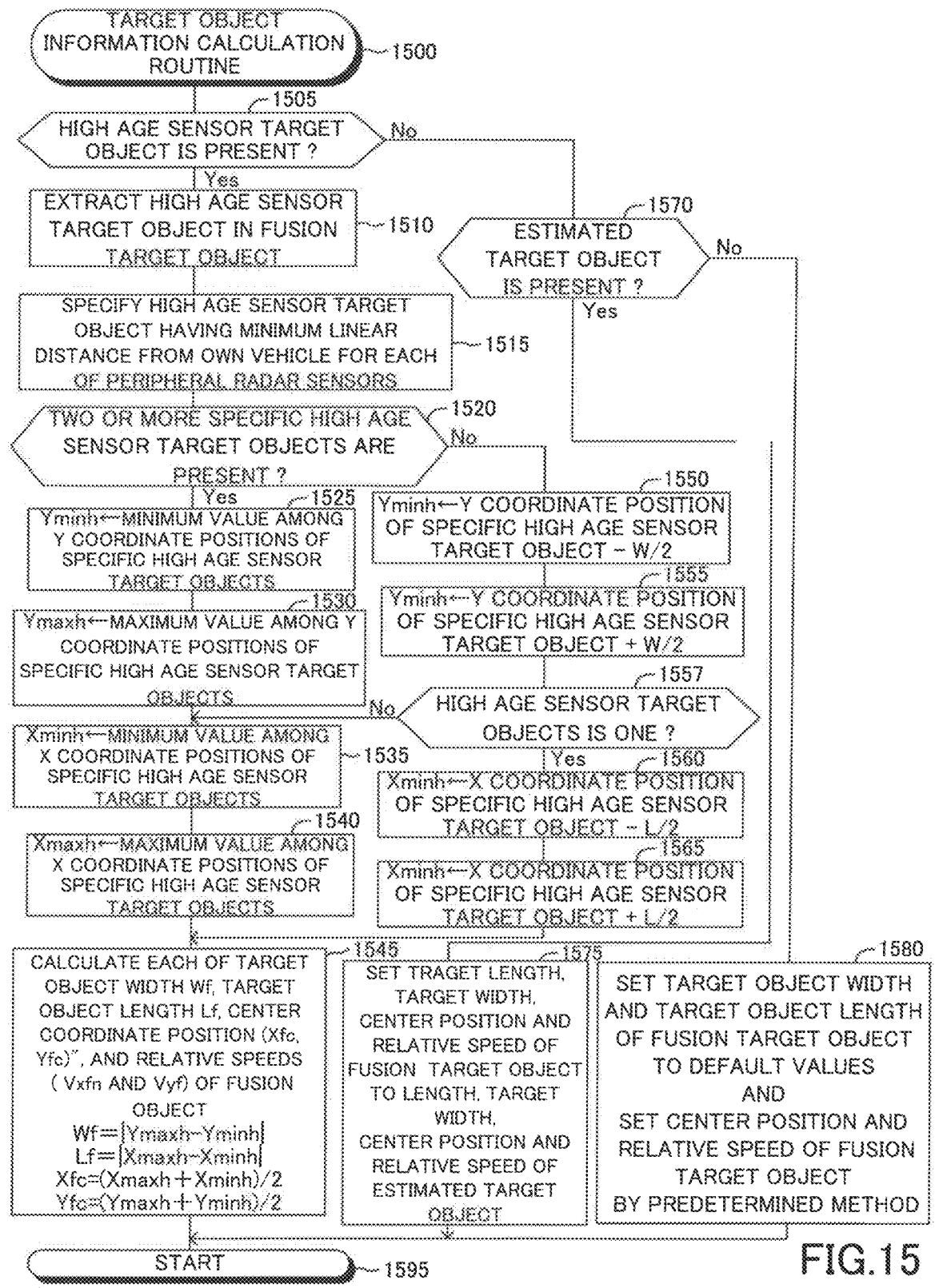
FIG. 15 is a flowchart for illustrating a routine executed by the CPU of the driving support ECU shown in FIG. 1.

Step 1120: the CPU executes a target object information calculation routine shown in FIG. 15, to thereby calculate the fusion target object information including "the target object width Wf, the target object length Lf, and the coordinate position (Xf, Yf)" of the newly generated fusion target object.

In the present example, the coordinate position (Xf, Yf) of the fusion target object is the coordinate (Xfc, Yfc) of the center position of the fusion target object. The routine shown in FIG. 15 will be described later in more detail. The CPU assigns identification information (ID) which is one of the fusion target object information to the newly generated fusion target object information.

When the previous fusion target object is present at the time point at which the CPU executes the process of step 1105, the CPU directly proceeds to step 1195 from step 1105 to tentatively terminate the present routine.

Figure 12:
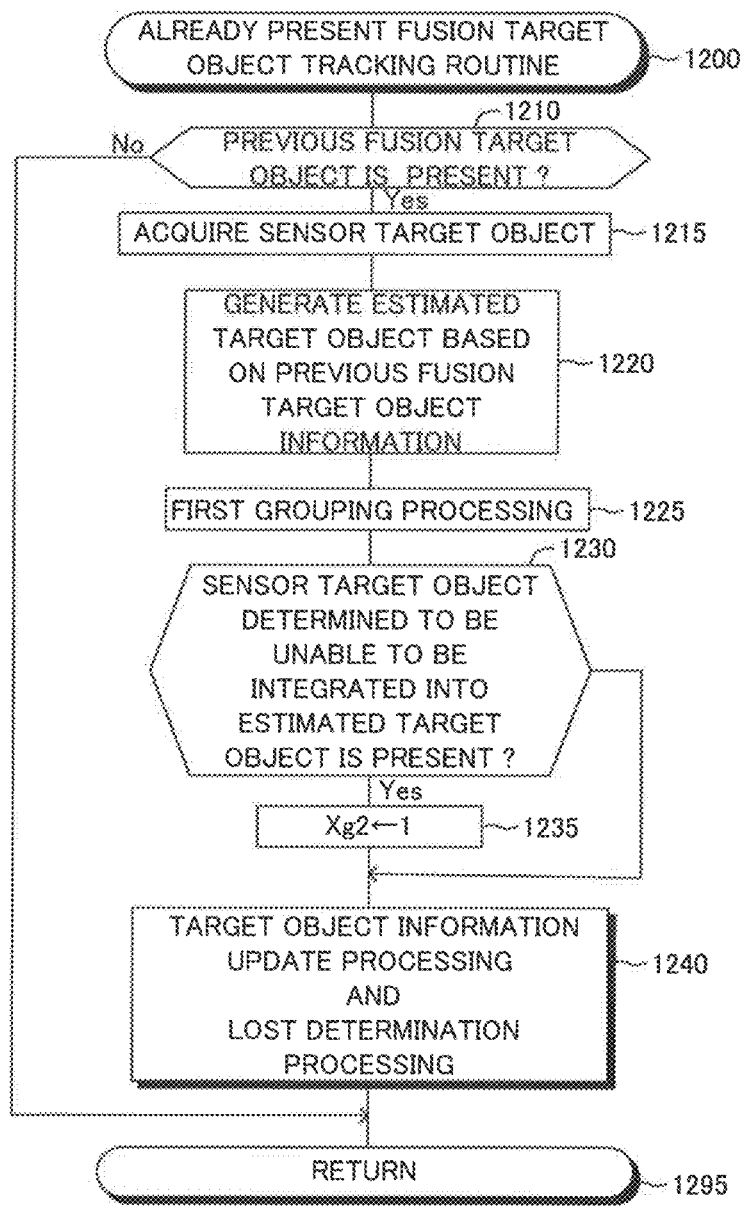
FIG. 12 is a flowchart for illustrating a routine executed by the CPU of the driving support ECU shown in FIG. 1.

Further, when an appropriate timing arrives, the CPU starts processing from step 1200 of an existing (already-present) fusion target object tracking routine shown in FIG. 12, and proceeds to step 1210 to determine whether or not the previous fusion target object is present. In other words, the CPU determines whether or not the fusion target object had been generated or updated at the time point of the previous calculation (one calculation period Δt before). When the previous fusion target object is not present, the CPU makes a "No" determination at step 1210 and proceeds directly to step 1295 to tentatively terminate the present routine.

When the previous fusion target object is present, the CPU makes a "Yes" determination at step 1210 and proceeds to step 1215 to acquire the sensor target object (that is, the present detected sensor target object) detected by the peripheral radar sensor 16a at the time point of the present calculation.

Thereafter, the CPU proceeds to step 1220 to generate the estimated target object based on the previous fusion target object information in accordance with the above-described method. In this case, the identification information of the estimated target object is set to be the same as the identification information of the previous fusion target object information from which the estimated target object was generated.

Thereafter, the CPU proceeds to step 1225 to execute the above-described first grouping process based on the estimated target object generated at step 1220. That is, the CPU fuses/integrates the sensor target objects (present detected sensor target objects) that satisfy the above grouping conditions for (with respect to) the estimated target object so as to link (associate) the sensor target objects acquired at step 1215 to the previous fusion target object, to thereby update (generate) the present fusion target object.

Thereafter, the CPU proceeds to step 1230 to determine whether or not the sensor target object determined to be unable to be fused/integrated to the estimated target object is present, among the sensor target objects acquired at step 1215.

When the sensor target object determined to be unable to be fused/integrated to the estimated target object is present, the CPU makes a "Yes" determination at step 1230 and proceeds to step 1235 to set a value of the second grouping flag Xg2 to "1". Thereafter, the CPU proceeds to step 1240. It should be noted that the value of the second grouping flag Xg2 is set to "0" in an initialization routine (not shown) executed when an unillustrated ignition key switch of the own vehicle SV is changed from OFF to ON.

In contrast, when the sensor target object determined to be unable to be integrated into the estimated target object is not present, the CPU makes a "No" determination at step 1230 to directly proceed to step 1240.

Figure 13:
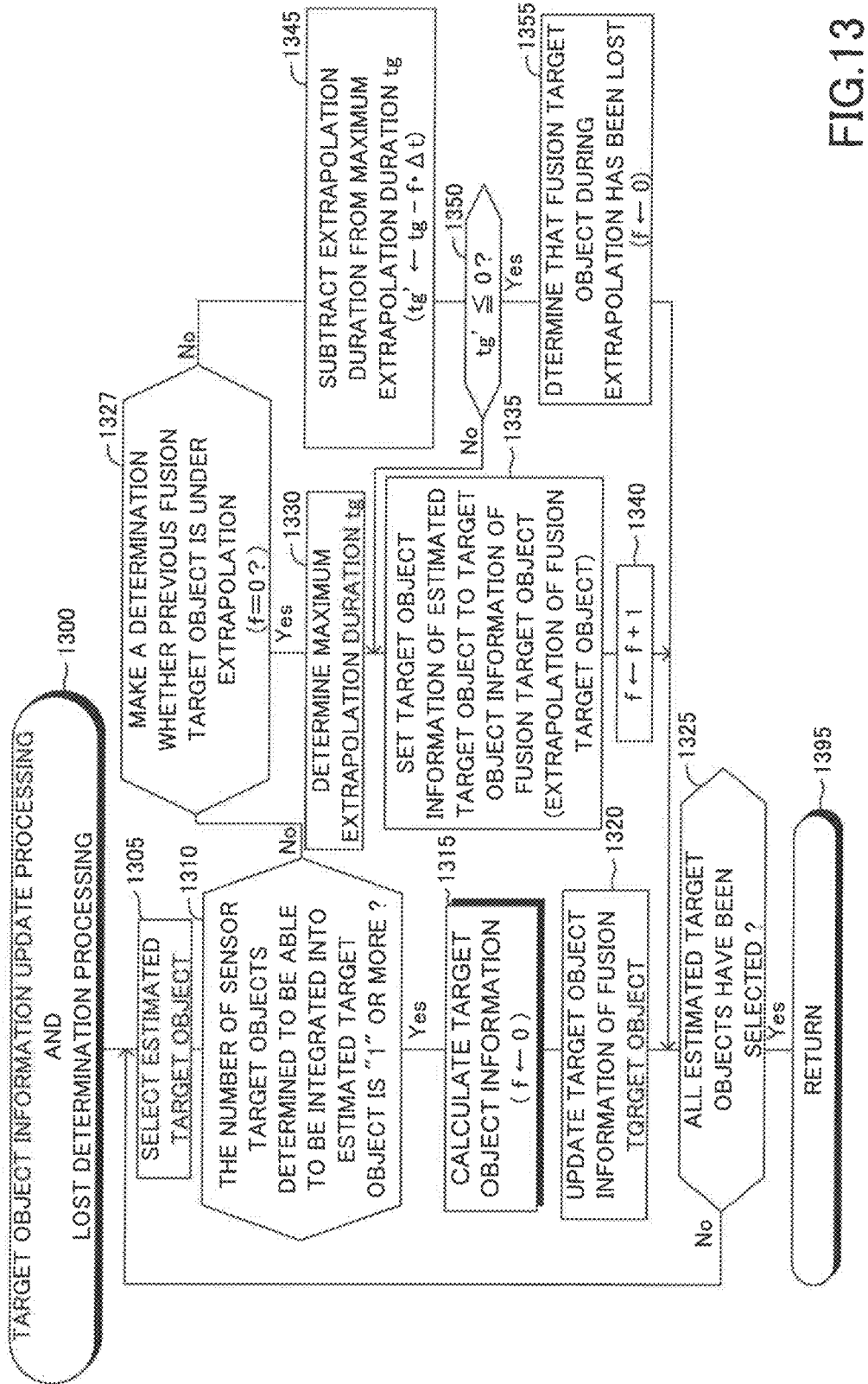
FIG. 13 is a flowchart for illustrating a routine executed by the CPU of the driving support ECU shown in FIG. 1.

The CPU proceeds to step 1240 to execute processes in the routine shown in FIG. 13, to thereby execute a target object information updating process and a lost determination process. More specifically, when the CPU proceeds to step 1240, the CPU proceeds to step 1305 via step 1300 shown in FIG. 13 to select an arbitrary estimated target object. Next, the CPU proceeds to step 1310, and determines whether or not the grouping target object number of the selected estimated target object (that is the number of the "sensor target objects determined to be able to be fused/integrated to the selected estimated target object") through the first grouping process executed at step 1225 is "1" or more.

When that grouping target object number is "1" or more, the CPU makes a "Yes" determination at step 1310 to proceed to step 1315. At step 1315, the CPU executes the target object information calculation routine (described later) shown in FIG. 15, to thereby calculate "the target object width Wf, the target object length Lf, and the coordinates (Xfc, Yfc) of the center position" included in the fusion target object information of the fusion target object, based on the sensor target object information of the sensor target objects that have been fused/integrated so as to constitute the fusion target object. Further, the CPU sets a value of the number of consecutive extrapolated frames f which is included in the fusion target object information to "0". The value of this consecutive extrapolated frame number f will be described later.

After the CPU finishes the process of step 1315, the CPU proceeds to step 1320 to update the fusion target object information with the fusion target object information calculated at step 1315. Next, the CPU proceeds to step 1325 to determine whether or not all of the estimated target objects at the time point of the present calculation have been selected through the process of step 1305. When at least one of the estimated target objects has not been selected yet through the process of step 1305, the CPU makes a "No" determination at step 1325 to return to step 1305 to select the estimated target object that has not been selected yet. In contrast, when all of the estimated target objects have already been selected through the process of step 1305, the CPU makes a "Yes" determination at step 1325, and proceeds to step 1295 of FIG. 12 via step 1395.

When the number of the sensor target objects (grouping target object number) determined to be able to be fused/integrated to the estimated target object selected at step 1305 is "0" at the time point at which the CPU executes the process of step 1310, the CPU executes the above-described extrapolation process of the fusion target object. That is, in this case, the CPU makes a "No" determination at step 1310 and proceeds to step 1327 to determine whether or not "the previous fusion target object, which is a base (origin) for the estimated target object which was selected at step 1305 and whose number of the sensor target objects to be fused/integrated to that the estimated target object is "0"" is not an object obtained through the extrapolation process. In actuality the CPU makes this determination at step 1327 through determining whether or not the value of the number of consecutive extrapolated frames f with respect to the previous fusion target object is "0".

The value of the number of consecutive extrapolated frames f was set to "0" at the above described step 1315 when the previous fusion target object had not been extrapolated. Therefore, when the value of the number of consecutive extrapolated frames f is "0" at the time point when the CPU executes the process of step 1327, it can be determined that the previous fusion target object had not been extrapolated. In this case, the CPU proceeds to step 1330 from step 1327 to determine the maximum extrapolation duration tg. The extrapolation process of the fusion target object is allowed to be continued for a time equal to the maximum extrapolation duration tg. In this example, the maximum extrapolation duration tg is a constant value, but may be a variable value.

Thereafter, the CPU proceeds to step 1335 to execute the extrapolation process of the fusion target object as described above to update the fusion target object information (the present fusion target object information) of the fusion target object at the time point of the present calculation using the target object information of the estimated target object. That is, the present fusion target object information is replaced by the target object information of the estimated target object. Thereafter, the CPU proceeds to step 1340 to increment the value of the number of consecutive extrapolated frames f of the fusion target object by "+1". Hereinafter, the fusion target object updated through the process of step 1335 and having the number of consecutive extrapolated frames f of 1 or more is referred to as a "fusion target object under extrapolation".

In contrast, at the time point at which the CPU executes the process of step 1327, when the "previous fusion target object, which is a base (origin) for the estimated target object which was selected at step 1305 and whose number of the sensor target objects to be fused/integrated to that the estimated target object is 0" is the "fusion target object under extrapolation" (in other words, when the number of consecutive extrapolated frames f is equal to or larger than "1"), the CPU makes a "No" determination at step 1327. Then, the CPU proceeds to step 1345 to calculate a residual extrapolation time tg' by subtracting the extrapolation duration (=the calculation period Δt×the number of consecutive extrapolation frames f) from the maximum extrapolation duration tg.

Thereafter, the CPU proceeds to step 1350 to determine whether or not the residual extrapolation time tg' calculated at step 1345 is equal to or smaller than "0".

When the residual extrapolation time tg' is greater than 0, the CPU makes a "No" determination at step 1350 and proceeds to step 1335 to execute the extrapolation process of the fusion target object. In this manner, the "extrapolation of the fusion target object" is repeatedly performed every time the predetermined calculation period Δt elapses, unless the number of the sensor target objects to be able to be grouped to the estimated target object obtained based on the fusion target object under extrapolation is equal to or larger than 1. Thereafter, the CPU updates the value of the number of consecutive extrapolated frames f at step 1340, and proceeds to step 1325.

When the extrapolation process of the fusion target object is repeatedly executed, and thus, the residual extrapolation time tg' becomes equal to or smaller than 0, the CPU makes a "Yes" determination at step 1350 and proceeds to step 1355 to determine that the "fusion target object under extrapolation" has been lost. That is, the CPU determines that the fusion target object under extrapolation has disappeared/lost. In this case, the CPU sets the value of the number of consecutive extrapolated frames f to "O".

Figure 14:
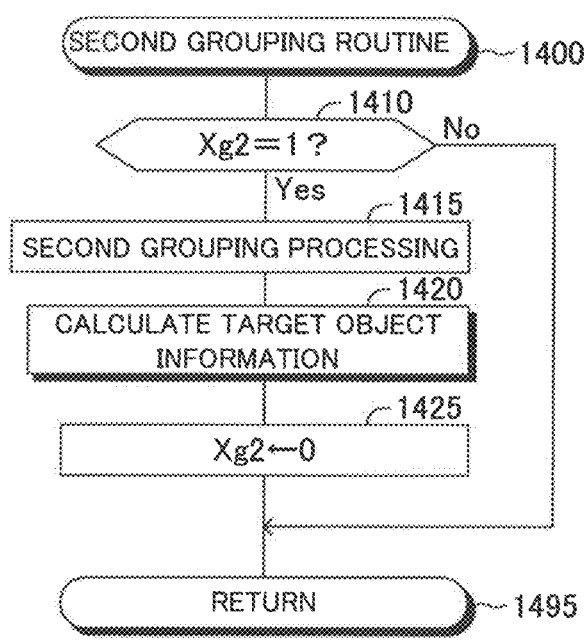
FIG. 14 is a flowchart for illustrating a routine executed by the CPU of the driving support ECU shown in FIG. 1.

Meanwhile, as described above, when the sensor target object determined to be unable to be fused/integrated to the estimated target object is present, the value of the second grouping flag Xg2 is set to "1" at step 1235 shown in FIG. 12. When the value of the second grouping flag Xg2 is set to "1", the second grouping routine shown in FIG. 14 is executed as described below. As a result, a new fusion target object is formed/generated based on the sensor target object determined to be unable to be fused/integrated to the estimated target object.

When an appropriate timing arrives, the CPU starts processing from step 1400 of the routine shown in FIG. 14 to proceed to step 1410, at which the CPU determines whether or not the value of the second grouping flag Xg2 is "1".

When the value of the second grouping flag Xg2 is "1", the CPU makes a "Yes" determination at step 1410 and sequentially executes the processes of steps 1415 to 1425 described below, then proceeds to step 1495 to tentatively terminate the present routine.

Step 1415: the CPU executes the above-described second grouping process.

Step 1420: the CPU determines the fusion target object information of the new fusion target object which has been generated at step 1415 through executing the target object information calculation routine shown in FIG. 15. It should be noted that the routine shown in FIG. 15 will be described later in more detail.

Step 1425: the CPU sets the value of the second grouping flag Xg2 to "0".

When the value of the second grouping flag Xg2 is "0" at the time point at which the CPU executes the process of step 1410, the CPU makes a "No" determination at step 1410 and proceeds directly to step 1495 to tentatively terminate the present routine.

Next, the target object information calculation routine shown in FIG. 15 will be described. As described above, the CPU executes the routine shown in FIG. 15 in each of steps 1120, 1315, and 1420, to thereby calculate "the target object width Wf, the target object length Lf, and the coordinates (Xfc, Yfc) of the center position" of the fusion target object. When a plurality of target fusion target objects (hereinafter referred to as "target information acquisition target fusion target objects" or "IAF targets") to be handled each of steps 1120, 1315, and 1420 are present, the CPU executes the routine shown in FIG. 15 for each of those IAF target objects.

The CPU starts processing from step 1500 of the routine shown in FIG. 15 and proceeds to step 1505 to determine whether or not the high AGE sensor target object is present in the sensor target objects belonging to the IAF target object.

When such a high AGE sensor target object is not present, the CPU makes a "No" determination at step 1505 and proceeds to step 1570 to determine whether or not the estimated target object corresponding to the IAF target object is present (or has been set).

When such an estimated target object is not present, the CPU makes a "No" determination at step 1570 and proceeds to step 1580 to set the "target object width Wf and the target object length Lf" of the IAF target object to predetermined respective values (default values). Further, the CPU sets "the X-Y coordinate position, the longitudinal relative speed, and the lateral relative speed" of the fusion target object to "the X-Y coordinate position, the longitudinal relative speed, and the lateral relative speed" of the sensor target object having the largest AGE among the sensor target objects belonging to the fusion target object, respectively. Thereafter, the CPU returns to the routine from which the CPU has jumped, via step 1595.

Further, when the estimated target object corresponding to the IAF target object is present at the time point at which the CPU executes the process of step 1570, the CPU makes a "Yes" determination at step 1570 and proceeds to step 1575 to set "the target object width Wf, the target object length Lf, the center coordinate position (Xfc, Yfc), the longitudinal relative speed, and the lateral relative speed" of the IAF target object to "the target object width, the target object length, the center coordinate position, the longitudinal relative speed, and the lateral relative speed" of the estimated target object, respectively. Thereafter, the CPU returns to the routine from which the CPU has jumped, via step 1595.

When the high AGE sensor target object is present in the sensor target objects belonging to the IAF target object at the time point at which the CPU executes the process of step 1505, the CPU determines "Yes" at step 1505 and proceeds to step 1510 to select/extract the high AGE sensor target object from the sensor target objects belonging to the IAF target object.

Next, the CPU proceeds to step 1515 and extracts/selects the specific high AGE sensor target object (serving as a sensor target object for width calculation) having the minimum distance (the linear distance) dn from the own vehicle SV, for each of the peripheral radar sensors 16a. It should be noted that, when only one high AGE sensor target object has been detected by any one of the peripheral radar sensors 16a, the CPU extracts/selects/designates that only one high AGE sensor target object as the specific high AGE sensor target object (serving as a sensor target object for width calculation).

Thereafter, the CPU proceeds to step 1520 to determine whether or not two or more of the specific high AGE sensor target objects have been extracted.

When two or more of the specific high AGE sensor target objects have been extracted, the CPU makes a "Yes" determination at step 1520 and sequentially executes the processes of steps 1525 to 1540 described below, and then proceeds to step 1545.

Step 1525: the CPU sets the value of the minimum lateral position Yminh to the minimum Y coordinate position Yobj among the Y coordinate positions Yobj of the specific high AGE sensor target objects (the CPU has the Yminh be equal to the minimum Y coordinate position Yobj).

Step 1530: the CPU sets the value of the maximum lateral position Ymaxh to the maximum Y coordinate position Yobj among the Y coordinate positions Yobj of the specific high AGE sensor target objects (the CPU has the Ymaxh be equal to the maximum Y coordinate position Yobj).

Step 1535: the CPU sets the minimum longitudinal position value Xminh to the minimum X coordinate position Xobj among the X coordinate positions Xobj of the high AGE sensor target objects (the CPU has the Xminh be equal to the minimum X coordinate position Xobj).

Step 1540: the CPU sets the maximum longitudinal position value Xmaxh to the maximum X coordinate position Xobj among the X coordinate positions Xobj of the high AGE sensor target objects (the CPU has the Xmaxh be equal to the maximum X coordinate position Xobj).

When the CPU proceeds to step 1545, the CPU calculates each of the "target object width Wf, the target object length Lf, and the center coordinate position (Xfc, Yfc)" of the IAF target object as follows:

The target object width $Wf=|Ymaxh-Yminh|$.

The target object length $Lf=|Xmaxh-Xminh|$.

The center X coordinate position $Xfc=(Xmaxh+Xminh)/2$.

The center Y coordinate position $Yfc=(Ymaxh+Yminh)/2$.

Further, the CPU calculates the longitudinal relative speed Vxfn and the lateral relative speed Vyf as described above, and thereafter, returns to the routine from which the CPU has jumped, via step 1595.

When only one of the specific high AGE sensor target objects has been extracted, the CPU makes a "No" determination at step 1520 and sequentially executes the processes of steps 1550 and 1555 described below, and then proceeds to step 1557.

Step 1550: the CPU sets the value of the minimum lateral position Yminh to a value obtained through subtracting a half (W/2) of the width W from the Y coordinate position Yobj of the specific high AGE sensor target object. The width W is set to the width of the estimated target object when the estimated target object is present. The width W is set to the default value when the estimated target object is not present. The width W used at the next step 1555 is set similarly.

Step 1555: the CPU sets the value of the maximum lateral position Ymaxh to the value obtained through adding half of the fixed W (W/2) to the Y coordinate position Yobj of the specific high AGE sensor target object.

As a result, the width Wf of the IAF target object calculated at step 1545 is equal to the width W, the center Y coordinate position Yfc of the IAF target object calculated at step 1545 is equal to the Y coordinate position Yobj of the specific high AGE sensor target object.

When the CPU proceeds to step 1557, the CPU determines whether or not the number of the high AGE sensor target objects extracted at step 1510 is one.

When the number of the high AGE sensor target objects extracted at step 1510 is one, the CPU makes a "Yes" determination at step 1557 and sequentially executes the processes of steps 1560 and 1565 described below, and then proceeds to step 1545.

Step 1560: the CPU sets the value of the minimum longitudinal position Xminh to a value obtained through subtracting a half (L/2) of the length L from the X coordinate position Xobj of the high AGE sensor target object (which is the specific high AGE sensor target object, in this case). It should be noted that the length L is set to the length of the estimated target object when the estimated target object is present. The length L is set to the default value when the estimated target object is not present. The length L used at the next step 1565 is set similarly.

Step 1565: the CPU sets the value of the maximum longitudinal position Xmaxh to the value obtained through adding half of the length L (L/2) to the X coordinate position Xobj of the high AGE sensor target object (which is the specific high AGE sensor target object in this case).

As a result, the length Lf of the IAF target object calculated at step 1545 is equal to the length L, and the center X coordinate position Xfc of the IAF target object calculated at step 1545 is equal to the X coordinate position Xobj of the high AGE sensor target object. Thereafter, the CPU returns to the routine from which the CPU has jumped, via step 1595.

In contrast, when the number of the high AGE sensor target objects extracted at step 1510 is two or more, the CPU makes a "No" determination at step 1557 to sequentially execute the above-described processes of step 1535 and step 1540, and then proceeds to step 1545. Thereafter, the CPU returns to the routine from which the CPU has jumped, via step 1595.

According to the above-described present apparatus, the following effects are obtained. That is, the present apparatus fuses/integrates the sensor target objects that are detected by the peripheral radar sensors 16a and are highly likely to be detected from a single three-dimensional object, so as to generate the fusion target object for identifying that single three-dimensional object.

In this case, the target object information including "the target object width, the target object length, the position, and the like" of the fusion target object is calculated based on the positions of the sensor target objects belonging to (or fused to) the fusion target object. However, the error in the lateral position of the sensor target object tends to become larger as the distance from the own vehicle SV to the sensor target object becomes longer.

In view of the above, the present apparatus specifies the sensor target object nearest to the own vehicle SV from the high AGE sensor target objects detected by particular one of the peripheral radar sensors 16a, and calculates the target object width Wf of the fusion target object using the lateral position of the specified high AGE sensor target object (the specific high sensor target object). As a result, the accuracy of the target object information (especially, the target object width Wf) of the fusion target object can be improved. Therefore, the present apparatus can accurately determine whether or not the lane changing support control can be performed.

Modified Examples

Although the embodiment of the present invention has been specifically described, the present invention is not limited to the above embodiment, and various modifications based on the technical idea of the present invention are possible.

For example, in the above-described embodiment, executing the following-travel inter-vehicle-distance control and the lane keeping control is a prerequisite for performing the lane changing support control. However, such a prerequisite is not necessarily required.

What is claimed is:

1. A target object information acquisition apparatus comprising:
   a plurality of radar sensors, each of which transmits radar wave to surroundings of an own vehicle to detect a reflection point of a three-dimensional object of said radar wave as a sensor target object, and acquires, as sensor target object information, a longitudinal position, a lateral position, and a relative speed of said detected sensor target object with respect to said own vehicle;
   fusion target object generating means for grouping, when a plurality of said sensor target objects are detected, said sensor target objects that are selected from said plurality of said detected sensor target objects and that are likely to be obtained from a single three-dimensional object, to generate a fusion target object representing said three-dimensional object; and fusion target object information calculating means for calculating a width of said fusion target object as one of attribute values of said fusion target object, based on said sensor target object information of said grouped sensor target objects that are used for generating said fusion target object, wherein, said fusion target object information calculating means is configured:

to select, when two or more of said sensor target objects detected by one of said radar sensors are present among said grouped sensor target objects, a specific one of said sensor target objects having a shortest distance from said own vehicle from among said two or more of said sensor target objects detected by said one of said radar sensors, as a width calculation sensor target object; and to calculate said width of said fusion target object using said lateral position with respect to said own vehicle of said width calculation sensor target object.

2. The target object information acquisition apparatus according to claim 1, wherein, said fusion target object information calculating means is configured:

to select, when the number of said sensor target objects detected by said one of said radar sensors among said grouped sensor target objects that are used for generating said fusion target object is only one, said only one sensor target object as said width calculation sensor target object;

to select, as a minimum lateral position, when the number of said sensor target objects selected as said width calculation sensor target objects is two or more, a lateral position which is the smallest among said lateral positions of said selected width calculation sensor target objects, and to select, as a maximum lateral position, a lateral position which is the largest among said lateral positions of said selected width calculation sensor target objects; and to calculate a magnitude of a difference between said maximum lateral position and said minimum lateral position, as said width of said fusion target object.

3. The target object information acquisition apparatus according to claim 1, wherein, said fusion target object information calculating means is configured to calculate said length of said fusion target object, which is one of said attribute values of said fusion target object, using said longitudinal positions of said grouped sensor target objects, and wherein, said fusion target object information calculating means is further configured:

to select, as a minimum longitudinal position, when the number of said grouped sensor target objects is two or more, a longitudinal position which is the smallest among said longitudinal positions of said grouped sensor target objects, and to select, as a maximum longitudinal position, a longitudinal position which is the largest among said longitudinal positions of said grouped sensor target objects; and to calculate a magnitude of a difference between said maximum longitudinal position and said minimum longitudinal position, as said length of said fusion target object.

4. The target object information acquisition apparatus according to claim 1, wherein, said fusion target object information calculating means is configured:

to select, as a first sensor target object, one of said grouped sensor target objects which has a detection period equal to or longer than a threshold time from among said grouped sensor target objects, said detection period being a period for which each of said grouped sensor target objects has been continuously detected, and to use only said sensor target object information of said selected first sensor target object as said sensor target object information for calculating said attribute values of said fusion target object.

* * * * *